(12) United States Patent
Schrecker

(10) Patent No.: US 8,819,445 B2
(45) Date of Patent: Aug. 26, 2014

(54) WIRELESS TOKEN AUTHENTICATION

(75) Inventor: Sven Schrecker, San Marcos, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/442,802

(22) Filed: Apr. 9, 2012

(65) Prior Publication Data

US 2013/0268767 A1 Oct. 10, 2013

(51) Int. Cl.
*G06F 21/00* (2013.01)

(52) U.S. Cl.
USPC ............................................. 713/185; 726/3

(58) Field of Classification Search
USPC ......................................................... 173/185
See application file for complete search history.

(56) References Cited

U.S. PATENT DOCUMENTS

| | | | |
|---|---|---|---|
| 5,913,163 A | 6/1999 | Johansson | |
| 5,987,610 A | 11/1999 | Franczek et al. | |
| 6,073,142 A | 6/2000 | Geiger et al. | |
| 6,460,050 B1 * | 10/2002 | Pace et al. | 1/1 |
| 6,542,729 B1 | 4/2003 | Chmaytelli et al. | |
| 6,975,425 B1 | 12/2005 | Abe et al. | |
| 7,318,234 B1 * | 1/2008 | Dharmarajan | 726/2 |
| 7,324,806 B2 | 1/2008 | Tomita | |
| 7,506,155 B1 | 3/2009 | Stewart et al. | |
| 7,565,554 B2 * | 7/2009 | Joosten et al. | 713/193 |
| 7,600,000 B2 | 10/2009 | Yao et al. | |
| 7,742,741 B2 | 6/2010 | Borowski et al. | |
| 7,840,206 B2 | 11/2010 | Kaechi | |
| 7,933,968 B1 | 4/2011 | Zimmerman | |
| 7,966,437 B1 | 6/2011 | Spoden | |
| 7,983,615 B2 | 7/2011 | Bryce et al. | |
| 7,995,119 B2 | 8/2011 | Kato et al. | |
| 8,099,605 B1 | 1/2012 | Billsrom et al. | |
| 8,176,230 B2 | 5/2012 | Chen et al. | |
| 8,280,304 B2 | 10/2012 | Hirsch | |
| 8,307,413 B2 * | 11/2012 | Smadja et al. | 726/9 |
| 8,331,860 B2 | 12/2012 | Sinivaara et al. | |
| 8,356,338 B1 | 1/2013 | Contino et al. | |
| 8,447,233 B2 | 5/2013 | Hirsch | |
| 8,565,132 B2 | 10/2013 | Shibuya | |
| 8,627,075 B2 | 1/2014 | Ikeda et al. | |

(Continued)

FOREIGN PATENT DOCUMENTS

| | | |
|---|---|---|
| EP | 1536306 A1 | 6/2005 |
| KR | 10-2009-0100112 A | 9/2009 |
| KR | 10-2011-0083050 A | 7/2011 |
| WO | WO 2013/101528 | 7/2013 |

OTHER PUBLICATIONS

Shwetak N. Patel; A Gesture-based Authentication Scheme for Untrusted Public Terminals; ACM; pp. 1-4.*

(Continued)

*Primary Examiner* — Michael S McNally
*Assistant Examiner* — Monjour Rahim
(74) *Attorney, Agent, or Firm* — Patent Capital Group

(57) ABSTRACT

Authentication data is received, from a first computing device, based on data received by the first computing device from a wireless token device, the authentication data used to authenticate a first user to a particular computing session hosted remote from the first computing device. The first computing device is authenticated to the particular computing session based on the received authentication data. The first computing device is permitted to consume resources of the particular computing session. In some instances, the data received by the first computing device from the wireless token device includes the authentication data.

22 Claims, 19 Drawing Sheets

(56) References Cited

U.S. PATENT DOCUMENTS

| | | |
|---|---|---|
| 2002/0059532 A1 | 5/2002 | Ata et al. |
| 2002/0115479 A1 | 8/2002 | Tischler |
| 2003/0056098 A1 | 3/2003 | Aihara |
| 2003/0109218 A1 | 6/2003 | Pourkeramati et al. |
| 2003/0131255 A1 | 7/2003 | Shim |
| 2004/0063471 A1 | 4/2004 | Kindo et al. |
| 2004/0073792 A1 | 4/2004 | Noble et al. |
| 2004/0123127 A1 | 6/2004 | Teicher et al. |
| 2004/0132437 A1 | 7/2004 | Ohmori et al. |
| 2004/0242250 A1 | 12/2004 | Sasai et al. |
| 2004/0247023 A1 | 12/2004 | Sasai et al. |
| 2005/0005041 A1 | 1/2005 | Lin et al. |
| 2005/0105734 A1* | 5/2005 | Buer et al. ............... 380/270 |
| 2005/0132075 A1* | 6/2005 | Creamer et al. ........... 709/229 |
| 2005/0235019 A1 | 10/2005 | Yang |
| 2005/0251633 A1 | 11/2005 | Micka et al. |
| 2005/0254650 A1 | 11/2005 | Sakurai et al. |
| 2005/0256907 A1 | 11/2005 | Novik et al. |
| 2006/0072241 A1 | 4/2006 | Feliss et al. |
| 2006/0176146 A1 | 8/2006 | Krishan et al. |
| 2006/0246840 A1 | 11/2006 | Borowski et al. |
| 2007/0015589 A1 | 1/2007 | Shimizu et al. |
| 2007/0067466 A1 | 3/2007 | Gallant et al. |
| 2007/0154162 A1 | 7/2007 | Kato et al. |
| 2007/0226501 A1 | 9/2007 | Saitoh |
| 2007/0239929 A1 | 10/2007 | Chen et al. |
| 2007/0249331 A1 | 10/2007 | Sinivaara et al. |
| 2007/0260751 A1 | 11/2007 | Meesseman |
| 2007/0294474 A1 | 12/2007 | Panabaker et al. |
| 2008/0052457 A1 | 2/2008 | Schilling et al. |
| 2008/0092204 A1 | 4/2008 | Bryce et al. |
| 2008/0109895 A1 | 5/2008 | Janevski |
| 2008/0113689 A1 | 5/2008 | Bailey |
| 2008/0117847 A1 | 5/2008 | Hamada |
| 2008/0141041 A1 | 6/2008 | Molaro et al. |
| 2008/0168197 A1 | 7/2008 | Salomon et al. |
| 2008/0207268 A1 | 8/2008 | Tom |
| 2008/0279382 A1 | 11/2008 | Chen et al. |
| 2008/0301790 A1 | 12/2008 | Halasz et al. |
| 2009/0044260 A1 | 2/2009 | Niglio et al. |
| 2009/0055408 A1 | 2/2009 | Warren et al. |
| 2009/0061773 A1 | 3/2009 | Loh et al. |
| 2009/0176529 A1 | 7/2009 | Warren et al. |
| 2009/0187759 A1 | 7/2009 | Marsico |
| 2009/0193178 A1 | 7/2009 | Warren et al. |
| 2009/0235021 A1 | 9/2009 | Panabaker et al. |
| 2009/0253374 A1 | 10/2009 | Matsuo et al. |
| 2009/0257592 A1 | 10/2009 | Sato |
| 2009/0289758 A1 | 11/2009 | Yuasa |
| 2009/0300020 A1 | 12/2009 | Chen et al. |
| 2010/0007768 A1 | 1/2010 | Yong et al. |
| 2010/0041447 A1 | 2/2010 | Graylin |
| 2010/0100590 A1 | 4/2010 | Palay et al. |
| 2010/0167643 A1 | 7/2010 | Hirsch |
| 2010/0245585 A1 | 9/2010 | Fisher et al. |
| 2010/0254368 A1 | 10/2010 | Yamaura |
| 2010/0311390 A9 | 12/2010 | Black et al. |
| 2010/0332682 A1 | 12/2010 | Sharp et al. |
| 2011/0063990 A1 | 3/2011 | Nogawa |
| 2011/0072503 A1 | 3/2011 | Tan |
| 2011/0111698 A1 | 5/2011 | Odakura |
| 2011/0138079 A1 | 6/2011 | Esaka et al. |
| 2011/0145299 A1 | 6/2011 | Zhou |
| 2011/0191833 A1 | 8/2011 | Yi et al. |
| 2011/0243256 A1 | 10/2011 | Matsuoka |
| 2011/0296186 A1 | 12/2011 | Wong et al. |
| 2011/0305335 A1 | 12/2011 | Negishi et al. |
| 2011/0319135 A1 | 12/2011 | Yuasa |
| 2012/0108181 A1 | 5/2012 | Matsuo et al. |
| 2012/0156996 A1 | 6/2012 | Oba et al. |
| 2012/0161924 A1 | 6/2012 | Lin |
| 2012/0171959 A1 | 7/2012 | Cheng |
| 2012/0185547 A1 | 7/2012 | Hugg et al. |
| 2012/0198535 A1* | 8/2012 | Oberheide et al. ............... 726/9 |
| 2012/0236788 A1 | 9/2012 | Maddali et al. |
| 2012/0309318 A1 | 12/2012 | Matsuo et al. |
| 2012/0322375 A1 | 12/2012 | Hirsch |
| 2012/0324556 A1* | 12/2012 | Yefimov et al. ............... 726/7 |
| 2013/0022185 A9* | 1/2013 | Khedouri et al. ........ 379/102.03 |
| 2013/0024932 A1 | 1/2013 | Toebes et al. |
| 2013/0047266 A1* | 2/2013 | Radhakrishnan et al. ...... 726/28 |
| 2013/0124858 A1 | 5/2013 | Kang |
| 2013/0171965 A1 | 7/2013 | Schrecker et al. |
| 2013/0174252 A1 | 7/2013 | Weber et al. |
| 2013/0231048 A1 | 9/2013 | Hirsch |
| 2013/0247117 A1 | 9/2013 | Yamada et al. |
| 2014/0009268 A1 | 1/2014 | Oshima et al. |

OTHER PUBLICATIONS

Information Technology Risk Management, Copyright 2002, © Glen B. Alleman, Niwor, Colorado, 22 pages.
U.S. Appl. No. 13/340,631, filed Dec. 29, 2011, entitled "Simplified Mobile Communication Device," Inventor Sven Schrecker.
U.S. Appl. No. 13/442,633, filed Apr. 9, 2012, entitled "Wireless Storage Device," Inventor Sven Schrecker.
U.S. Appl. No. 13/442,743, filed Apr. 9, 2012, entitled "Wireless Token Device," Inventor Sven Schrecker.
U.S. Appl. No. 13/442,830, filed Apr. 9, 2012, entitled "Wireless Token Device," Inventor Sven Schrecker.
Bluetooth™ Security White Paper, by Bluetooth SIG Security Expert Group, dated Apr. 19, 2002, 46 pages.

* cited by examiner

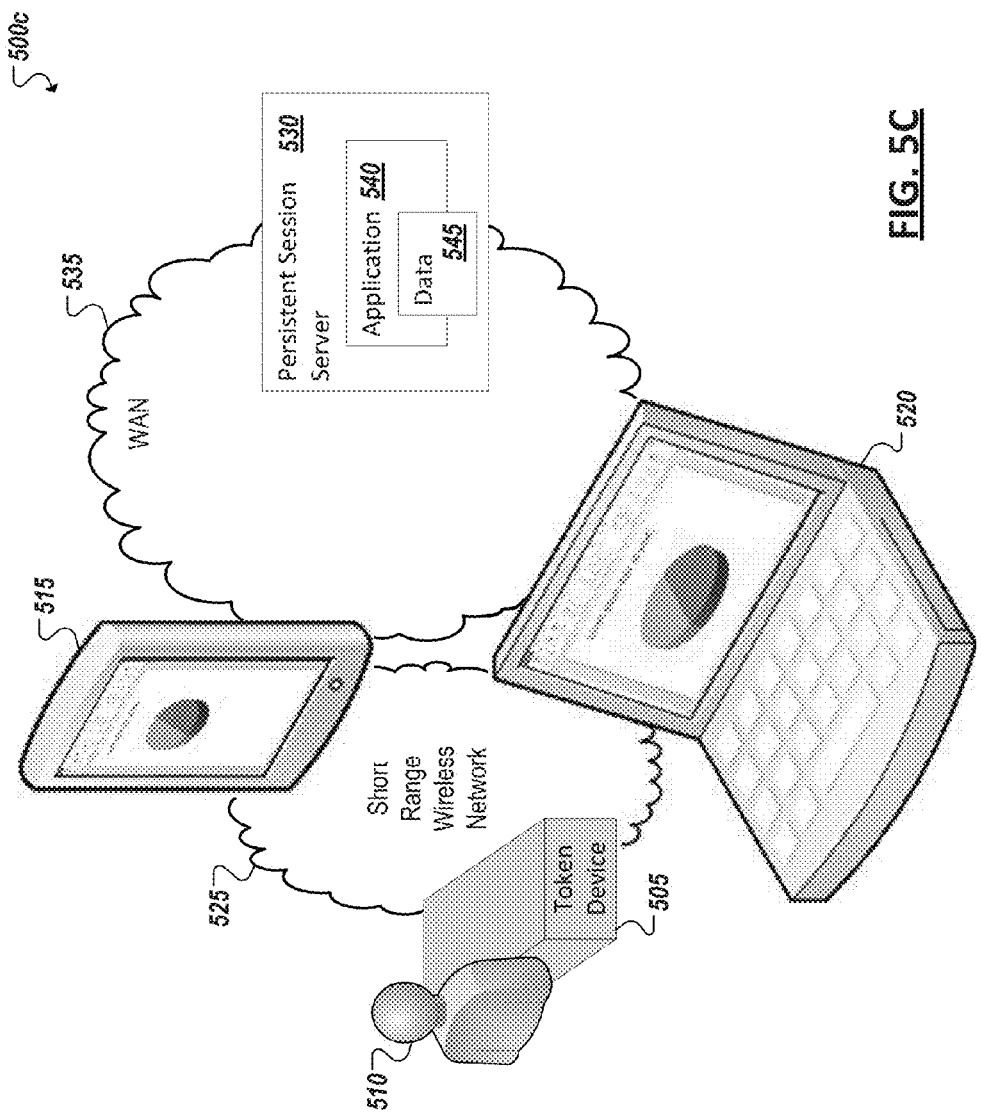

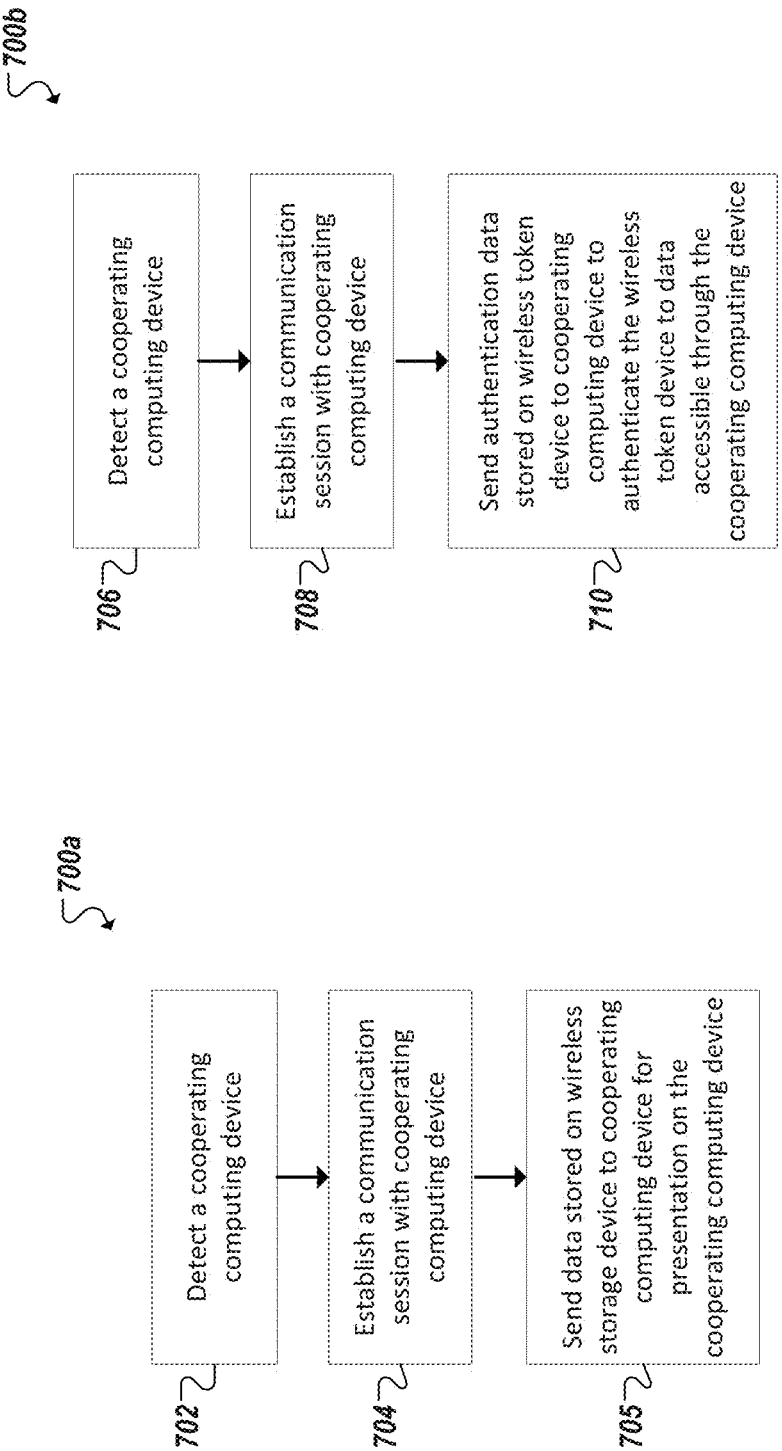

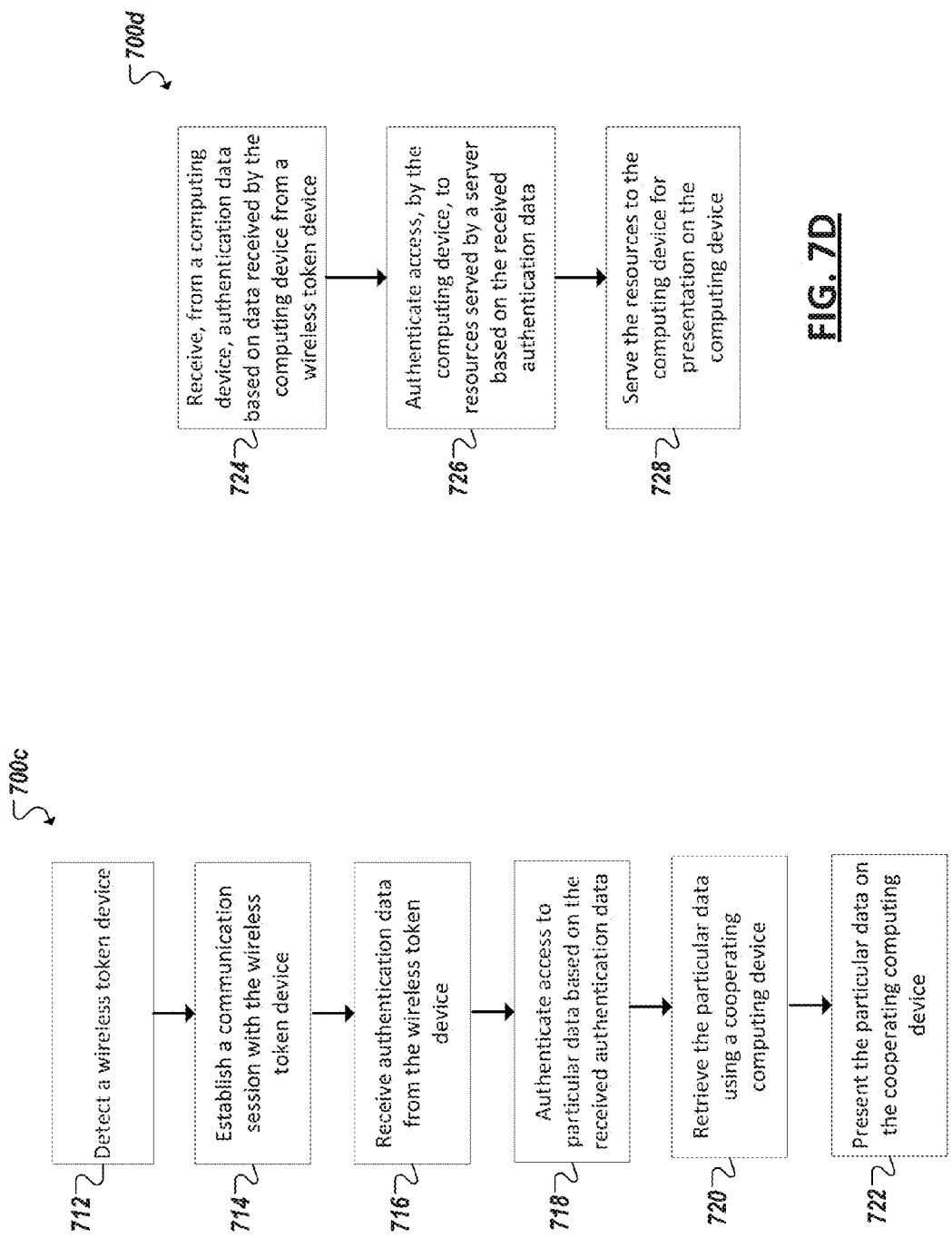

WIRELESS TOKEN AUTHENTICATION

TECHNICAL FIELD

This disclosure relates in general to the field of computing security and, more particularly, to security tokens.

BACKGROUND

With the sale, production, and deployment of mobile phones and other handheld and mobile computing devices eclipsing more traditional desktop personal computing devices, consumers and users have come to expect increased mobility in their access to computer applications, the Internet, digital communications, and other software services and resources. This increased demand has contributed to a corresponding acceleration in developments and advancements within mobile computing devices. Service providers and device manufacturers, carriers, and retailers have developed business models in some cases encouraging the purchase of new devices, with some customers electing to purchase or replace new devices, such as new cell phones and smart phones, multiple times per year to keep pace with the latest models and feature offerings. Aside from the financial commitment of purchasing multiple devices, migrating and reproducing data and programs from one mobile device to another newer device can be difficult and inconvenient. Thumbdrives, portable hard drives, and other portable storage devices have been developed to plug-in to mobile computing devices (e.g., via USB or other hardware ports) to assist in managing data between multiple devices. Additionally, remote data storage services, such as cloud-based storage systems, have been developed that can allow users to centrally deposit data for download and use on any one of a variety of devices, among other solutions.

BRIEF DESCRIPTION OF THE DRAWINGS

FIGS. 5A-5C are simplified block diagrams illustrating example operations in connection with authentication to an example persistent computing session using an example wireless token device in accordance with some embodiments;

FIGS. 7A-7E are simplified flowcharts illustrating example techniques for utilizing a wireless token device.

Like reference numbers and designations in the various drawings indicate like elements.

DETAILED DESCRIPTION OF EXAMPLE EMBODIMENTS

Overview

Figure 1:
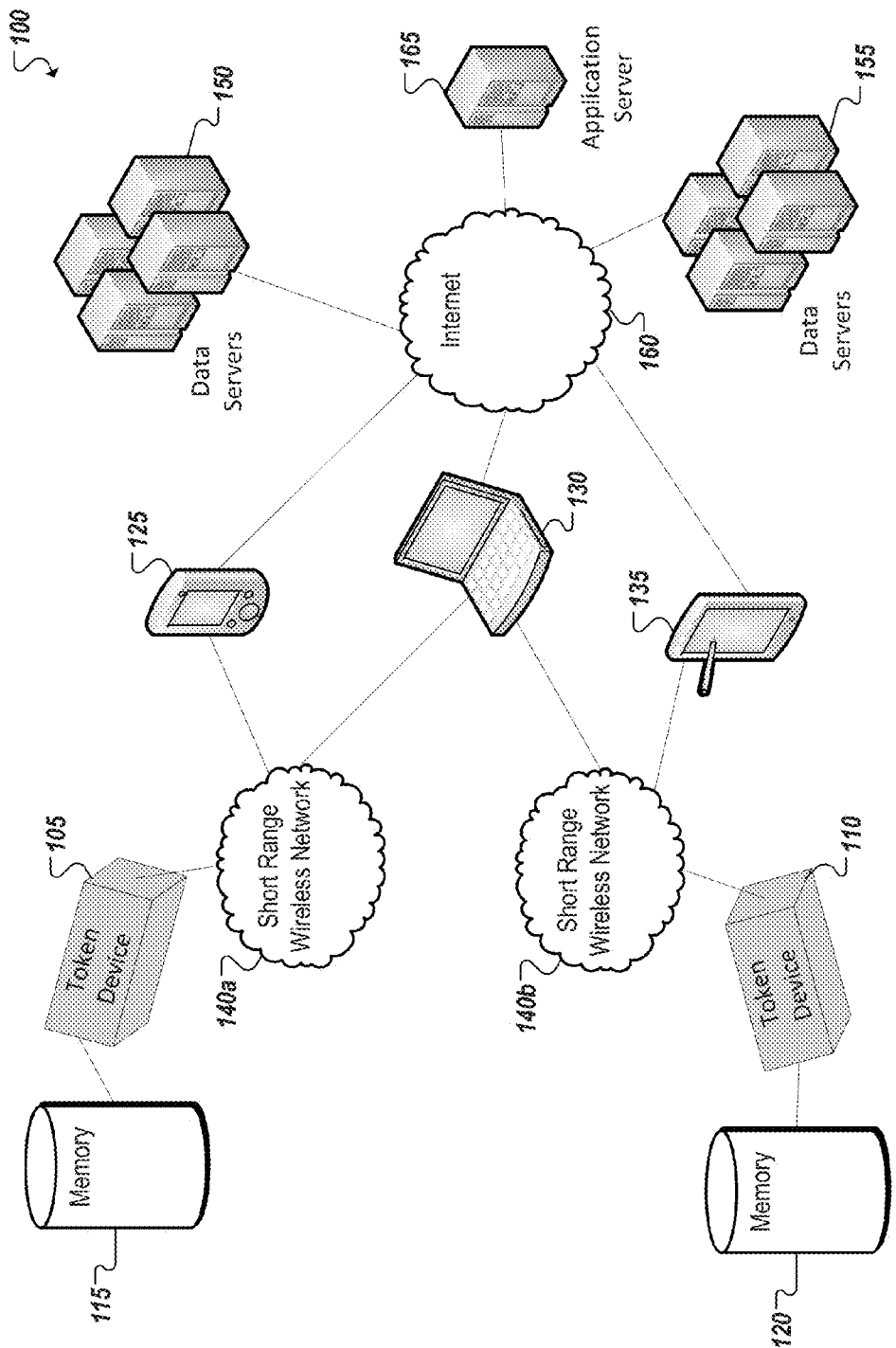
FIG. 1 is a simplified schematic diagram of an example computing system including one or more wireless token devices operating in connection with one or more cooperating computing devices in accordance with one embodiment.

In general, one aspect of the subject matter described in this specification can be embodied in methods that include the actions of receiving, from a first computing device, authentication data based on data received by the first computing device from a wireless token device, the authentication data used to authenticate a first user to a particular computing session hosted remote from the first computing device. The first computing device can be authenticated to the particular computing session based on the received authentication data. The first computing device can be permitted to consume resources of the particular computing session.

Another general aspect of the subject matter described in this specification can be embodied in systems including at least one processor device, at least one memory element, and a session manager. The session manager can be adapted, when executed by the at least one processor device to manage hosting of a particular computing session, receive from a first computing device authentication data forwarded by the first computing device from a wireless token device, the authentication data used to authenticate a first user to the particular computing session, authenticate the first computing device to the particular computing session based on the received authentication data, and permit the first computing device to consume resources of the particular computing session.

These and other embodiments can each optionally include one or more of the following features. The authentication data can be received from the first computing device at a first instance and the authentication data can be received from a second computing device at a second instance, the authentication data forwarded by the second computing device from the wireless token device to the server device. The second computing device can be authenticated to the particular computing session based on the received authentication data, and the second computing device can be permitted to consume resources of the particular computing session. Participation of the first computing device in the particular computing session can be terminated. The participation of the first computing device can be terminated based on a removal of the wireless token device from the first computing device. An attempt to re-authenticate the first computing device can be made based on forwarding of additional authentication data received by the first computing device from the wireless token device. Termination of the first computing device's participation in the particular computing session can be based on termination data received from the first computing device identifying that the first computing device is no longer in communication with the wireless token device. Both the first and second computing devices can be authenticated to the particular computing session at a first instance. The first computing device can be of a first type and the second computing device can be of a second type different from the first type. At least one of the resources of the particular computing session can be consumed by both the first and second computing devices. The first and second computing devices can each present the at least some of the resources consumed by both the first and second computing devices and at least some of the resources consumed by both the first and second computing devices can be rendered on the first computing device differently than on the second computing device. The type of each device can be identified based on authentication data received from the respective device.

Further, these and other embodiments can also each optionally include one or more of the following features. The authentication data can originates from the wireless token device and can be forwarded by the first computing device to a server device hosting the particular computing session. The authentication data can be encrypted using a public key paired to a private key of the server device. The authentication data can be hosted on the first computing device and receipt of data from the wireless token can authorize forwarding of the authentication data to a server device hosting the particular computing session. The wireless token device can be paired to a server device hosting the particular computing session. The particular computing session can be a digital streaming media presentation. The particular computing session can be a session with a software application hosted by the server device. The particular computing session can be hosted by a cloud computing system. User profile data associated with a first user can be identified and the user profile data can be applied within the particular computing session. At least one other device associated with a second user other than the first user can also consume resources within the particular computing session.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

Example Embodiments

FIG. 1 is a simplified block diagram illustrating an example implementation of a computing system 100 including a plurality of wireless token devices (e.g., 105, 110) each capable of establishing and participating in communications over one or more short-range wireless communication networks (e.g., 140a, 140b), such as Bluetooth and WiFi networks. Wireless token devices 105, 110 can include memory (e.g., 115, 120) including data for communication over short-range wireless networks. Wireless token devices 105, 110 can utilize short range wireless networks 140a, 140b and participate in communications with cooperating computing devices (e.g., 125, 130, 135). For instance, wireless token devices (e.g., 105, 110) can function to authenticate a user's access to particular data stored on either or both of a particular cooperating computing device (e.g., 125, 130, 135) or data stored on the wireless token device 105, 110 itself. In some instances, wireless token devices 105, 110 can function as a wireless, physical security token for authenticating a user to a device (e.g., 125, 130, 135) or data and software programs accessible through the device (e.g., 125, 130, 135), including data served by remote data servers (e.g., 150, 155) and services hosted by remote application servers (e.g., 165) accessible by cooperating computing devices (e.g., 125, 130, 135) over one or more longer-range networks, including the Internet, virtual local area networks (VLANs), and the other networks (e.g., 160). In other instances, the wireless token devices 105, 110 can function as wireless storage devices storing data that can be sent for consumption by cooperating computing devices (e.g., 125, 130, 135), the wireless token devices 105, 110 thereby serving as a wireless, portable memory drive. In still other instances, wireless token device 105, 110 can both be used to authenticate users to particular devices and data stores, as well as store data for consumption on computing devices used by the holder of the wireless token device (e.g., 105, 110).

Wireless token devices 105, 110 can include small, lightweight, and otherwise easy to carry (or wear) devices that allow a user to control access to particular data stored on one or more of the token device, cooperating computing devices, or other computing devices remote from the token device and cooperating computing device. In some instances, a wireless token device can possess small dimensions while still including functionality including antennae and network adapters, among other additional or alternative components, adapted to establishing connections with other devices (e.g., cooperating computing devices 125, 130, 135) over short-range wireless networks 140a, 140b. Memory (e.g., 115, 120) of the respective wireless token devices (e.g., 105, 110) can include data that is shared with cooperating computing devices 125, 130, 135 over the short-range wireless networks 140a, 140b to control access to particular data as well as allow the particular data to be presented on user interfaces of the cooperating computing devices 125, 120, 135. Indeed, in some instances, wireless token devices 105, 110 can lack user interfaces for graphically and/or audibly presenting data or allowing users to interact with the data. Accordingly, cooperating computing devices 125, 130, 135 can supplement the user interface deficiencies of example wireless token devices 105, 110 allowing users to view, interact with, or otherwise use data authenticated to using a wireless token device (e.g., 105, 110).

In some instances, providing wireless token devices 105, 110 with limited input/output (I/O) functionality and omitting such components as graphical displays, keypads, touchscreens, speakers, and other user interfaces and controls can allow for wireless token devices that are adapted to be conveniently carried or worn by a user, thereby more directly connecting the user to the wireless token device (e.g., 105, 110) and physically associating the user with the wireless token device. Tying a token device 105, 110 to a particular user can assist in guarding possession of such a token for use in authenticating the device's user with particular cooperating computing devices (e.g., 125, 130, 135) as well as data, applications, or other digital resources accessible through the cooperating computing devices.

In some instances, a wireless token device (e.g., 105) can accept communications, instructions, and other inputs from a cooperating computing device (e.g., 125) connected to the wireless token device over a short range wireless network (e.g., 140a). For example, a digital certificate, encryption key, device identifier, or other data and resources for use in authorizing access to one or more of the cooperating computing device 125, data accessible using the cooperating computing device 125, or the wireless token device. Additionally, in instances where the wireless token device (e.g., 105) stores data for consumption by applications and other programs of a cooperating computing device (e.g., 125) or other devices (e.g., application server 165), interactions with this data by other devices, including modifications to the data implemented by a user through a user interface of the cooperating computing device, can be communicated to the wireless token device (e.g., 105) to update the data stored on the wireless token device, among other examples. Generally, cooperating computing devices (e.g., 125, 130, 135) connected to and used in connection with a wireless token device (e.g., 105, 110) can be used to supplement the simplified functionality of the wireless token device. In some examples, wireless token devices can include insufficient or lower-quality data rendering and graphical display capabilities, user interfaces, etc. Cooperating computing devices (e.g., 125, 130, 135), can be used, for instance, to render or display data stored on the wireless token device or another device that cannot be displayed, modified, or accessed using the wireless token device alone. For instance, access to, display of, and interaction with data hosted by remote servers (e.g., 150, 155, 165) can be authorized through authentication data provided by the wireless token device (e.g., 105) (for instance, data hosted by remote servers (e.g., 150, 155, 165)) and/or permit user interactions with the data.

Communications between a wireless token device (e.g., 105, 110) and one or more cooperating computing devices (e.g., 125, 130, 135) can take place over a short-range wireless network (e.g., 140a, 140b) that limits the ability of two devices to connect based on their proximity to each other, such as Bluetooth, closed virtual private WiFi networks (over a local router), among other examples. Communication links and channels over short-range wireless networks 140a, 140b can utilize authenticated network access protocols such as EAP, EAP-TLS, EAP-MS-CHAP v2, and PEAP or other standards. Additionally, wireless protection protocols such as WEP, WPA, WPA2, SAFER+ block ciphers, etc. can also be used, among other techniques to secure communications between wireless token devices (e.g., 105, 110) and cooperating computing devices (e.g., 125, 130, 135).

In general, "servers," "clients," and "computing devices," including computing devices used to implement system 100 (e.g., 105, 110, 125, 130, 135, 150, 155, 165), can include electronic computing devices operable to receive, transmit, process, store, communicate, or manage data and information associated with the software system 100. As used in this document, the term "computer," "computing device," "processor," or "processing device" is intended to encompass any suitable processing device. For example, elements of the system 100 may be implemented using distributed computing environments, including parallel processing environments, server pools, and cloud computing environments. Further, any, all, or some of the computing devices may be adapted to execute any operating system, including Linux, UNIX, Windows Server, etc., mobile operating system, including Apple iOS™, Google Android™, Windriver™, etc. as well as virtual machines adapted to virtualize execution of a particular operating system, including mobile, customized, and proprietary operating systems. Further, servers (e.g., servers 150, 155, 165), clients, and computing devices can be capable of hosting and/or serving data, software applications, and services, including mobile, distributed, enterprise, or cloud-based software applications, data, and services.

Cooperating computing devices 125, 130, 135 can include wireless-enabled endpoint devices such as laptop computers, desktop computers, tablet computers, shared computing kiosks, smartphones, personal digital assistants, handheld video game consoles, televisions, smart appliances (such as refrigerators, HVAC systems, washing machines, etc.), and other devices capable of connecting wirelessly to a wireless token device (e.g., 105, 110) over a short range network (e.g., 140a, 140b). Attributes and functionality of cooperating computing devices 125, 130, 135 can differ widely from device to device, including the operating systems and collection of software programs loaded, installed, executed, operated, or otherwise accessible to the device, as well as the tools, subsystems, controls, display units, speakers, microphones, keypads, mice, trackballs, cameras, network cards and adapters, graphic cards and adapters, sound cards and adapters, and other components integrated or connected to the cooperating computing device. A device can additional include a respective set of programs that can include operating systems, applications (including "mobile apps"), plug-ins, applets, virtual machines, machine images, drivers, executable files, and other software-based programs capable of being run, executed, or otherwise used by the respective cooperating devices (e.g., 125, 130, 135). Some programs and data stored on or otherwise accessible through a cooperating computing device can be associated with a particular user profile, restricting access to particular programs to users logged-in or otherwise authenticated in connection with the user profile.

Each cooperating computing device can include at least one graphical display device and user interfaces allowing a user to view and interact with graphical user interfaces (GUIs) of applications and other programs provided in system 100. In general, cooperating computing devices can include any electronic computing device operable to receive, transmit, process, and store any appropriate data associated with the software environment of FIG. 1. It will be understood that there may be any number of endpoint devices associated with system 100, as well as any number of endpoint devices external to system 100. Further, the term "client," "endpoint device," "mobile device," and "user" may be used interchangeably as appropriate without departing from the scope of this disclosure. Moreover, while each cooperating computing device may be described in terms of being used by one user, this disclosure contemplates that many users may use one computer or that one user may use multiple computers.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Portable computing devices such as smartphones, personal video game players, portable music players, laptop computers, tablet computers, and the like have become feverishly popular in part because of the convenient access they provide to a multitude of computer-enabled tasks, services, and functions. Users can read, write, send and receive email; generate documents; access the Internet; receive GPS directions; make telephone calls; play video games; play digital media; send SMS messages; video chat; take videos and photos; among a continuing stream of evolving functions and uses. Additionally, users are increasingly acquiring and using multiple computing devices. For instance, a user may have a smart phone for work, a different personal smart phone, a tablet computer for personal use, a laptop for work, a video game system and/or media server for their home theater, etc. Further, as each of these respective devices evolves, users may replace and supplement their devices with newer devices with updated or additional functionality.

Managing data across a multitude of devices can be challenging to consumers. Users can synchronize devices to some degree in an attempt to keep some files and data consistent across two or more of their devices, although users often start from scratch when purchasing new devices to replace an outdated, lost, or broken device, re-loading their data and favorite software programs onto the new device. Further, traditional mobile phones and devices are carried in purses, bags, or pockets and are frequently misplaced, lost, or stolen, allowing savvy thieves to gain unauthorized access to the owner's data, data and telephone service, among other sensitive and valuable assets. System implementations such as that outlined in FIG. 1 can resolve many of the issues identified above, among others.

Figure 2:
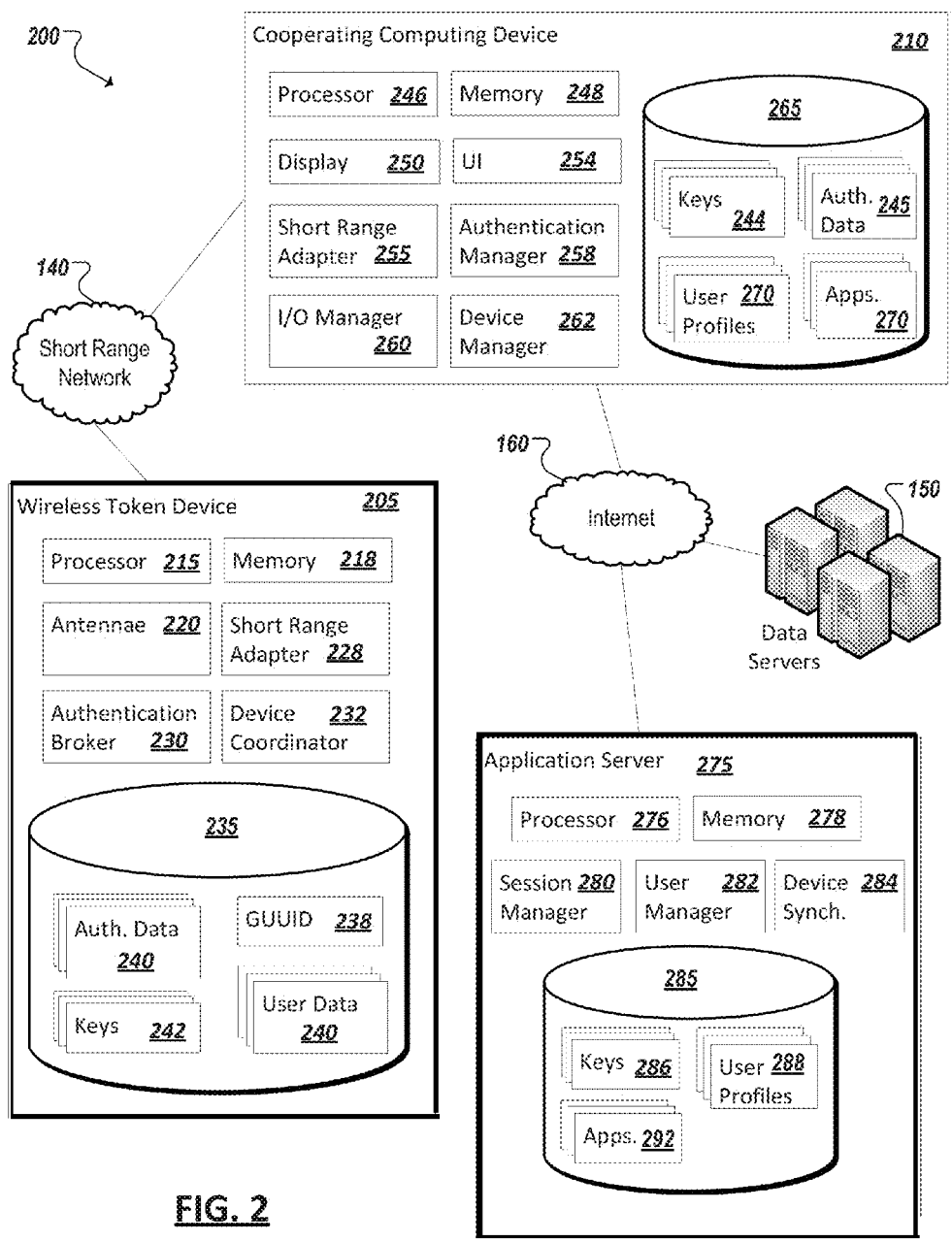
FIG. 2 is a simplified block diagram of an example wireless token device and an example cooperating computing device in accordance with one embodiment.

For instance, turning to FIG. 2, a simplified block diagram 200 is shown of an example system including an example wireless token device 205 and an example cooperating computing device 210. The wireless token device 205 can be a device equipped to be easily carried or worn by a user, such as a device in the form and dimensions of a thumbdrive, bracelet, ring, mobile headset, card, neck chain, or other physical embodiment, that can operate cooperatively with one or more cooperating computing devices (e.g., 210), for instance, by connecting to and communicating with the cooperating computing device 210 over, for example, a short range network 140. A wearable or otherwise easily carried device can assist in keeping the simplified mobile communication device 205 secure and in the possession of its owners. Generally, wireless token device 205 can authenticate access to particular electronic and digital resources owned by the owners of the wireless token device 205, the resources capable of being accessed using the cooperating computing device 210. Further, access to cooperating computing devices (e.g., 210) can themselves be protected by the wireless token device 205, making cooperating computing devices and their data unusable by thieves and other unauthorized users not in possession of the wireless token device 205.

A wireless token device 205 can include one or more processors 215 and memory elements 218 used to execute software or firmware stored, downloaded, embodied, or otherwise accessible to the device 205, including signal processing functionality, data encryption, file management, authentication data management, and other functionality and operations in association with short-range wireless network adapters 228 and modules (e.g., 230, 232) of the wireless token device 205. In this particular example, wireless token device 205 can include components and functionality to enable the wireless token device 205 to connect and receive data from one or more cooperating computing devices (e.g., 210) over one or more short range networks (e.g., 140). For example, wireless token device 205 can include one or more short-range wireless network adapters 228 (e.g., for one or more wireless communication protocols with which the wireless token device 205 is adapted to communicate), authentication broker 230, and device coordinator 232. Short range network adapter 228 can be adapted to establish, discover, connect to, and communicate in communication sessions within one or more different short range wireless networks (e.g., 140), including ad hoc wireless networks established using Bluetooth or WiFi and thereby facilitate the wireless token device's 205 connection to and participation in communication sessions with cooperating devices over a short range network, such as a Bluetooth piconet or a WiFi network. A short-range wireless network adapter 228 can further include or interface with antennae (e.g., 220) and other hardware for discovering, transmitting, and receiving radio signals to and from other devices in connection with participation within a wireless communication session over one or more short range wireless networks (e.g., 140).

Wireless token devices (e.g., 205) may lack most of the functionality available in modern computing devices, such as personal computers, tablet computers, smart phones, and the like. In some instances, wireless token device 205 include minimal software, in some cases limited to logic for use in engaging in communication sessions over short range networks (e.g., 140) with other computing devices (e.g., 210) and managing data stored by the wireless token device 205 and/or communicated in communication sessions with cooperating computing devices. Further, wireless token devices 205 may lack robust user interfaces and lack the ability to accept user inputs in connection with the accessing of data stored on the wireless token device 205. In some instances, simplified communication devices 205, while lacking higher-level tactile inputs, such as a keypad, touchscreen, or the like, may include basic tactile inputs for performing basic operations such as powering the wireless token on or off, selecting a particular short-range wireless protocol (e.g., WiFi vs. Bluetooth), among other examples. Further, wireless token devices (e.g., 205) can omit graphical display devices adapted for rendering data received, transmitted, or authenticated to during communication sessions with cooperating computing devices (e.g., 210). In some instances, despite lacking functionality for rendering graphics, text, etc., simple visual indicators can be provided in some implementations of a wireless token devices, including simple light indicators communicating to the user that the wireless token device 205 is powered on, has a low battery, has connected to a cooperating computing device and/or is receiving/sending data in a communication session, among other examples. In some instances, settings and configurations of wireless token device 205, as well as some data stored on wireless token device 205 can be modified or accessed using I/O devices and functionality of a cooperating computing device (e.g., 210) with which the wireless token device 205 has established a communication session.

Wireless token device 205 can serve as a physical token for authenticating a user on one or more other computing devices and/or particular data and programs accessible through the other computing devices, such as cooperating computing device 210. Authentication data (e.g., 240) can be sent by the wireless token device 205 to a cooperating computing device 210, for instance, over a short range network connection (e.g., 140). Such authentication data can be used to authenticate or otherwise make the cooperating computing device 210, or particular data, programs, or user profiles available to the holder of the wireless token device 205. For instance, authentication data can include a digital signature or certificate, token, password, encryption key, or other authentication data. Further, authentication data can be dependent on identifying that the wireless token device's 205 is collocated (or within a predetermined proximity) of the cooperating computing device 210.

In some instances, authentication data 240 can be encrypted by one or more keys 242 held by the wireless token device 205. For instance, in one example, authentication data can be retrieved or generated that is encrypted, for instance, using a private key of the wireless token device 205. If the wireless token device 205 has a pre-existing relationship (e.g., has previously registered with the cooperating computing device) and has shared a public key paired to the wireless token device's private key with the cooperating computing device 215, the cooperating computing device can decrypt the authentication data 240, read the authentication data 240 in the clear, and authenticate the holder of the wireless token device 205. In such an example, access to the cooperating computing device 210 (such as a laptop, smartphone, etc.) can be locked pending authentication using a registered wireless token device (e.g., 205). In another example, a cooperating computing device (e.g., 210) can be authenticated to the wireless token device 205. In such an example, authentication data can be sent from the cooperating computing device 210 to the wireless token device 205 and the authentication data can be encrypted using a private key of the cooperating computing device 210. Authenticating the cooperating computing device (e.g., to allow access to data stored on the wireless token device 205) can include the wireless token device 205 using a previously-obtained public key paired to the particular cooperating computing device (e.g., 210) to attempt to read the authentication data received from the cooperating computing device 210 and confirm that the cooperating computing device is a device trusted to utilize data stored on the wireless token device. In still other examples, authentication data can be exchanged between the wireless token device 205 and the cooperating computing device 210 (e.g., with first authentication data sent by the wireless token device 205 and second authentication data sent from the cooperating computing device 210), to verify the identities of the respective devices and authenticate the use of the device by the other, among other examples.

In still other examples, wireless token device 205 can provide a key through which particular data can be decrypted for access on the cooperating computing device 210. In some instances, data can be routed through the wireless token device 205 and decrypted at the wireless token device 205, and returned for presentation on the cooperating computing device 210. In other implementations, an encryption key can be communicated from the wireless token device to the cooperating computing device 210 (e.g., following authentication of the device) for temporary use by the cooperating computing device in decrypting data for presentation or other use on the cooperating computing device.

In one example implementation, wireless token device 205 can include an authentication broker 230 adapted to coordinate the various authentication-related transactions, including those examples described above and elsewhere herein. The authentication broker 230 can pass authentication data 240, as well as other data, such as a user identifier, such as a globally-unique user identifier (GUUID) (e.g., 238), to a cooperating computing device (e.g., 210) in connection with a user authenticating to the cooperating computing device 210 by virtue of the user possessing the mobile communication device 205. In other instances, the authentication broker 230 can process authentication data received from the cooperating computing device, including the decryption (e.g., using keys 242) of encrypted authentication data received from a cooperating computing device (e.g., 210). Similarly, cooperating computing devices (e.g., 210), in some implementations, can include modules, such as an authentication manager 258 for use in connection with receiving authentication data (e.g., 240) from a wireless token device (e.g., 205). In some instances, specialized software can be downloaded to a cooperating computing device 210 for use in communicating with a wireless token device 205 (e.g., including such modules as authentication manager 258), in connection with registration of the cooperating computing device 210 with a wireless token device 205. An example authentication manager (e.g., 258) can, for instance, use authentication data to authenticate a user to a particular user profile (such as a profile corresponding to the GUUID 238), decrypt data stored on the cooperating computing device 210 (e.g., using a key received from a wireless token device), among other uses and examples.

A wireless token device 205 can further include additional modules and functionality. In some instances, a single wireless token device 205 can connect to and operate cooperatively with a plurality of different cooperating devices. This can permit a user to control access to a plurality of devices used or owned by the user using a single token (e.g., 205). For instance, a device coordinator 232 can be provided to manage the simplified wireless token device's 205 cooperation with multiple different cooperating devices, as well as different types of cooperating devices. In some examples, relationships can be established between a particular wireless token device 205 and two or more cooperating computing devices. Device coordinator 232 can be used to register a cooperating computing device with the wireless token device 205 and establish a relationship between the wireless token device 205 and cooperating computing device (e.g., 210) as well as identify that a pre-existing relationship exists between the wireless token device 205 and a particular cooperating computing device (e.g., based on a previous registration and/or cooperative interaction session between the devices, for instance, over a short range network 140). For example, the wireless token device 205 and/or the particular cooperating computing device can generate and exchange digital certificates and other data encrypted using a public key of the other device to pair and set protocols for future interactions and authentications.

Cooperating computing devices (e.g., 210) can include more robust computing functionality, including I/O and graphic display capabilities not available on wireless token devices (e.g., 205). For instance, an example cooperating computing device 210, such as a tablet computer, smart phone, personal digital assistant, personal video game player, media player, laptop or personal computer, can include one or more processors 246, memory elements 248, a graphical display 250, and a user interface 254 capable of accepting tactile inputs from a user, such as a keypad, touchscreen, trackball, touchpad, keyboard, mouse, or other such device or module.

In addition to providing graphic display and I/O capabilities above that of the wireless token device 205, cooperating computing devices (e.g., 210) can also include more diversified and extensive software and data storage capabilities. For instance, cooperating computing devices (e.g., 210) can include one or more software programs including an operating system and applications 268, as well as data used by the software applications 268. Further, in some implementations, cooperating computing devices can possess more robust data communication capabilities than some wireless token devices (e.g., 205), such as the ability to communicate over the Internet and other data networks. In some examples, user profiles 270 can be maintained and stored (e.g., in data store 265) on a cooperating computing device 210 to include application data, and other files and data corresponding to a particular user. A user of a particular wireless token device (e.g., 205) can authenticate to the cooperating computing device 210 and/or a particular user profile 270 so as to gain access to the data included in the user profile. In other instances, all or a portion of the user profile data can alternatively be stored on a wireless token device 205. In still other instances, all or a portion of user profile data can be stored on devices remote from wireless token device 205 and cooperating computing devices (e.g., 210), including cloud-based devices and other outside servers (e.g., 150, 275), the user profile data accessible to either or both of the wireless token device 205 and cooperating computing devices (e.g., 210).

Cooperating computing devices 210 can include additional modules and functionality including a short range network adapter 255, I/O manager 260, and device manager 262. A short-range wireless network adapter 255 can be adapted to facilitate a cooperating computing device's 210 participation in a communication session over one or more short-range networks 140, such as Bluetooth, WiFi, ZigBee™, and Ant™ networks, etc. I/O manager 260 can be used to coordinate communication of user interactions received through the I/O devices (e.g., 254) of the cooperating computing device 210 with a wireless token device 205 over a short-range network connection. For instance, a UI of the cooperating computing device 210 can be used to set particular settings and modify other data stored on wireless token device 205. Additionally, in some instances, UIs of a cooperating computing device 210 can be used to offer two-factor authentication that includes the submission of user-provided authentication inputs, such as keyed-in passwords and PIN codes, voice recognition samples, fingerprint scans, etc. via the cooperating computing device's 210 UI 254.

As noted above, wireless token devices (e.g., 205) can connect to and establish relationships with multiple different cooperating computing devices (e.g., 210). Similarly, a single cooperating computing device 210, such as a single tablet computer, laptop computer, etc. can provide I/O support for and/or be authenticated to using multiple different wireless token devices 205. For instance, a single computing device may maintain multiple different user profiles 270 and be shared among multiple users, each with their own associated wireless token device 205. Accordingly, device manager 262 can be used to manage relationships with pre-identified wireless token devices 205, for instance, to streamline connection to and provide enhanced support for particular wireless token devices 205 with which a particular cooperating computing device 210 has already communicated or established relationships. In some instances, the establishing of a relationship between a wireless token device 205 and a cooperating computing device 210 can serve as a prerequisite to authentication of a user at the cooperating computing device through the sharing of a GUUID 238, authentication data 240, and other data from the wireless token device 205.

In one particular example, the GUUID 238 of the simplified mobile communication device 210 can be private to the device 205 and not shared with, or capable of being shared with or exposed to other devices. In some instances, a wireless token device 205 and a particular cooperating computing device 210 can mutually authenticate, or pair, to the other. During such a pairing, certificates can be generated from the respective keys (e.g., the GUUID 238 of the simplified mobile communication device 205), and combined with the public key of the other device for use in pairing and establishing a trusted relationship between the two cooperating devices without requiring the GUUID (or other keys) to be explicitly shared between the devices. Other techniques can also be employed to pair, register, or otherwise establish a relationship between a wireless token device (e.g., 205) and a cooperating computing device (e.g., 210).

Further, additional functionality can be provided through example cooperating computing devices (e.g., 210). For example, in some instances, cooperating computing devices 210, can include functionality for connecting to and communicating over various other communication networks, including long-distance communication networks, such as VLANs, the Internet 160, and even cellular networks (such as cellular broadband data networks). Further, certain cooperating computing device 210 implementations can include other functionality including a cloud data manager, for use in authenticating to and accessing data and services in cloud computing or other remote computing environments (e.g., 150, 275), for instance, on behalf of a user authenticated to the data using authentication data 240 provided through a cooperating wireless token device 205.

As an example, an application server 275, including one or more processors 276 and one or more memory devices 278. In some instances, an application server 275 can include modules and functionality including a session manager 280, user manager 282, device synchronization engine 284, among other modules supplementing or combining the functionality of modules 280, 282, 284. An application server 275, or other server system, can host a computing session that can be accessed by one or more computing devices (e.g., 210) over a network, such as the Internet 160. Computing sessions hosted by the application server 275 can be private and resources of the computing sessions can be reserved for authenticated users (and their associated devices used to access the computing sessions). Authentication of a device to a computing session hosted by the application server 275 can be facilitated through the passing of authentication data from the wireless token device 205 to the application server 275. In some instances, a user can utilize a cooperating computing device 210 to access resources of and participate in one or more persistent sessions hosted by the application server 275. The cooperating computing device 210 can acquire authentication data stored and maintained at the wireless token device 205 and forward the authentication data to the application server 275 to authenticate the cooperating computing device 210 (and its users) to the session. Such authentication data can include features similar to that described in connection with other implementations described in this specification.

An example application server (e.g., 275) can utilize a session manager (e.g., 280) to control and manage computing sessions hosted by the application server 275. For example, the application server 275 can host persistent computing sessions such as a streaming media session (e.g., presenting digital music, video, etc.), a video gaming session, cloud-based productivity session, multimedia teleconference, among other examples. A session manager 280 can manage all aspects of constructing, maintaining, and persisting a computing session. Further, a session manager 280 can be used to control access to the computing session, including the authenticating of authorized users and client devices to the computing session. In some examples, a computing session can be restricted to authorized users and authentication data can be provided to the application server 275 to authenticate users to one or more sessions hosted by the application server 275.

An application server 275 can maintain one or more data structures 285 for use in managing authentication of users to computing sessions provided by the application server 275. In some instances, memory and data structures (e.g., 285) of the application server 275 can maintain encryption keys and other authentication data and tools (e.g., 286) for use in authenticating users to a computing session. For instance, application server 275 can maintain one or more keys for encrypting or decrypting messages exchanged with client devices including cooperating computing devices (e.g., 210). In one example, a wireless token device 205 can provide encrypted authentication data for forwarding to the application server 275 through the cooperating computing device 210. Application server 275 can receive such forwarded authentication data and decrypt the authentication data using one or more keys (e.g., 286). Authentication data (e.g., 240) can be encrypted or otherwise protected, in some instances, in order to condition a particular cooperating computing device's (e.g., 210) participation within the computing session on the cooperating computing device's collocation with the wireless token device of a user authorized to participate in the computing session. Additionally, in persistent computing sessions, multiple instances of authentication data (e.g., 240) can be exchanged over the life of the computing session to re-authenticate the participating computing device (e.g., 210) at multiple points in the computing session to re-confirm that the participating computing device continues to be collocated with and receiving authentication data from a particular wireless token device 205.

Application server 275 can host computing sessions tailored to or otherwise associated with a particular user. User profiles (e.g., 288) can be maintained for a plurality of users that can consume computing sessions hosted by the application server 275. Users' identities can be verified and established by the application server 275, in some implementations, using a user manager 282. User manager 282 can, in some instances, identify a user and corresponding user profile data (e.g., 288) from authentication data received by the application server 275, including authentication data originating from a wireless token device (e.g., 205) associated with the corresponding user. Further, the applications and services (e.g., 292) provided by the application server in the session can also be tailored to the particular user.

Figure 3A:
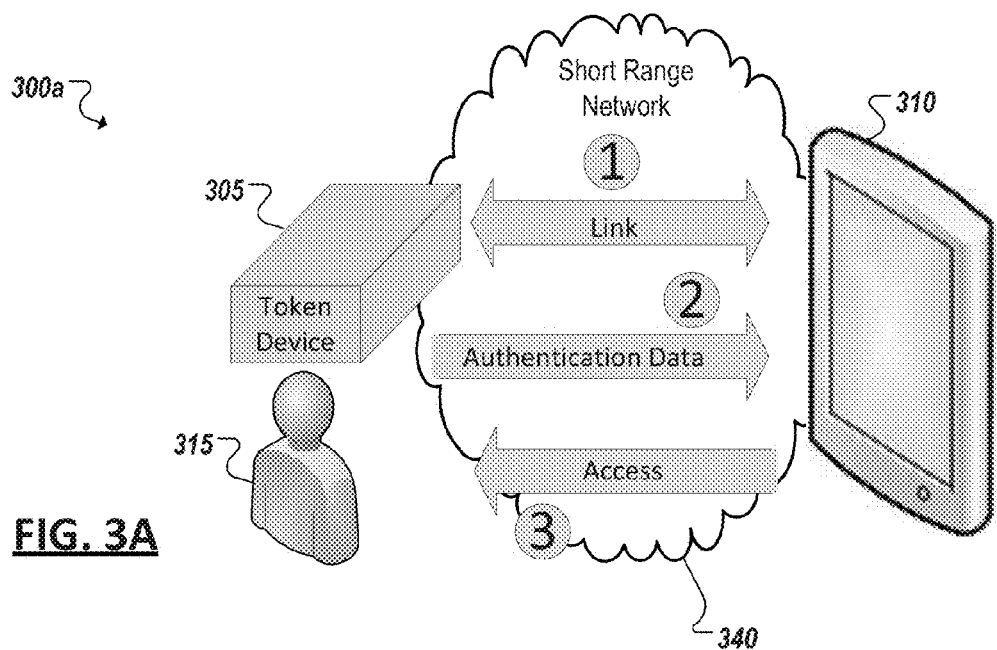
FIGS. 3A-3F are simplified block diagrams illustrating example operations including an example wireless token device in accordance with some embodiments.

Turning to FIG. 3A, example interactions and operations are represented in block diagram 300a involving a wireless token device 305 and a cooperating computing device, such as an example touchscreen computer 310. Wireless token device 305 and touchscreen computing device 310 can discover that the other device is within range of a particular short range wireless network 340 (and therefore substantially within range of, or collocated with the other device). In some instances, one or both of wireless token device 305 and touchscreen computing device 310 can be configured so that another device is determined to be in-range when the other device exhibits a signal strength suggesting that the other device is within a particular threshold proximity of the other device, thereby implying that the user (e.g., 315) of the cooperating computing device (e.g., 310) and the holder of the wireless token device (e.g., 305) are the same person or otherwise collocated. Upon establishing that the devices are substantially collocated, a connection link, or pairing can be established between the two devices 305, 310, for instance, using traditional Bluetooth connection protocols or other handshaking or session building protocols.

Upon establishing a communication link between the wireless token device 305 and touchscreen computing device 310, authentication data can be transmitted over the link from the wireless token device 305 to the cooperating computing device 310. The authentication data can include, for instance, a digital signature verifying (or capable of being processed by cooperating computing device 310 to verify) the identity and authenticity of the wireless token device 305 and thereby also its holder/user (e.g., 315). In one example, failure to identify a legitimate wireless token 305 (such as a token device that has been pre-registered with the computing device 310) can cause a particular cooperating computing device 310 to remain locked and unusable. In such instances, without the co-presence of an authorized wireless token device 305, the particular cooperating computing device 310 can be rendered useless, disincentivizing theft or attempted unauthorized access of the device and protecting data stored or accessible through the device 310. In some instances, data on the cooperating computing device 310 can be encrypted and can only be decrypted using keys provided through an authorized wireless token device (e.g., 305). Further, in some instance, if the holder of an authorized wireless token device 305 authenticates to a cooperating computing device 310, the cooperating computing device 305 can detect (e.g., based on the wireless token becoming out-of-range of their short-range wireless network link) that the wireless token device 305 is out-of-range of the cooperating computing device 310, triggering the automatic locking of the cooperating computing device. Accordingly, in such instances, a cooperating computing device can be provided whose access is substantially dependent on the physical presence of an authorized user (i.e., a user holding an authorized wireless token device (e.g., 305).

Figure 3B:
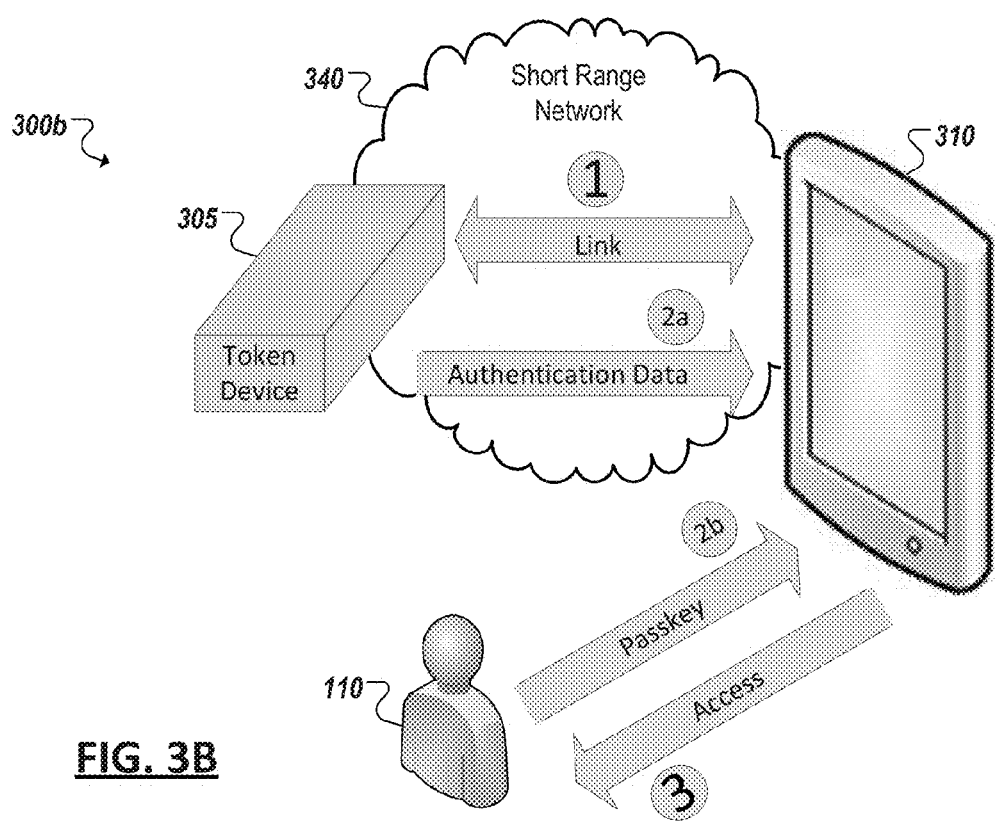

FIG. 3B illustrates another example of interaction and operations between devices 305, 310 shown in block diagram 300b. In some instances, two-factor authentication can be used to authenticate a user 315 to a particular cooperating device 305. For instance, as in the example of FIG. 3A, authentication data can be communicated from the wireless token device 305 to a potential cooperating device in order to identify that the token is valid and authentic. However, in some instances, such protections might not guard against instances where an unauthorized user gains access to both the cooperating computing device 310 and the wireless token device 305. Accordingly, two-factor authentication can be provided by prompting the user 315 for biometric or other inputs confirming the user's identity. Such inputs can include, for example, a PIN or other password entered via the touchscreen of device 310, a voice sample captured by a microphone of cooperating device 310 (e.g., to be compared to a voice sample of an authorized user using voice recognition processes), a fingerprint scan, facial recognition (e.g., using a camera of the cooperating device 310), or other authentication information provided from the user through a user interface of the cooperating device 310.

In one example, authentication data communicated to the cooperating computing device 310 by wireless token device 305 can include an encrypted message indicating a password or other user-provided authentication data. The message can be encrypted, for instance, using a private key of the wireless token device, allowing holders of a public key of the wireless token device to authenticate the wireless token device 305 by virtue of the cooperating computing device 310 holding a public key paired to the private key of the particular wireless token device 305. In this particular example, if the cooperating computing device holds the public key, it can determine that it has previously communicated (e.g., been paired) with the wireless token device 305 if it is able to decrypt the encrypted authentication data message received from the wireless token device 305. The cooperating computing device 310 can decrypt the message to identify proper values of secondary user-provided data to be entered by the user 315. For example, the authentication message, when decrypted by the cooperating computing device, can reveal a password (or voice profile data, or other authentication information) to the cooperating computing device for comparison against user-entered authentication data. If the user then correctly enters the contained password via a user interface of the cooperating computing device (e.g., a touchscreen) the user can be authenticated to the device 310.

A wireless token device 305 can simplify authentication to cooperating computing devices 310 by allowing its holder to automatically authenticate to a device based on the holder possessing the wireless token device 305. Two-factor authentication, in some instances, can compromise this particular advantage, by forcing the user to provide the cooperating computing device with secondary authentication information. Accordingly, in some implementations, two-factor authentication can be invoked periodically or sporadically so that in most instances mere possession of the wireless token device 305 is sufficient to authenticate the user to the cooperating computing device 310, while in other select instances (e.g., once a week, after a prolonged period since the last authentication, random instances, etc.) two-factor authentication is applied forcing the user to provide supplementary authentication information in addition to the authentication data provided by the wireless token device 205.

Figure 3C:
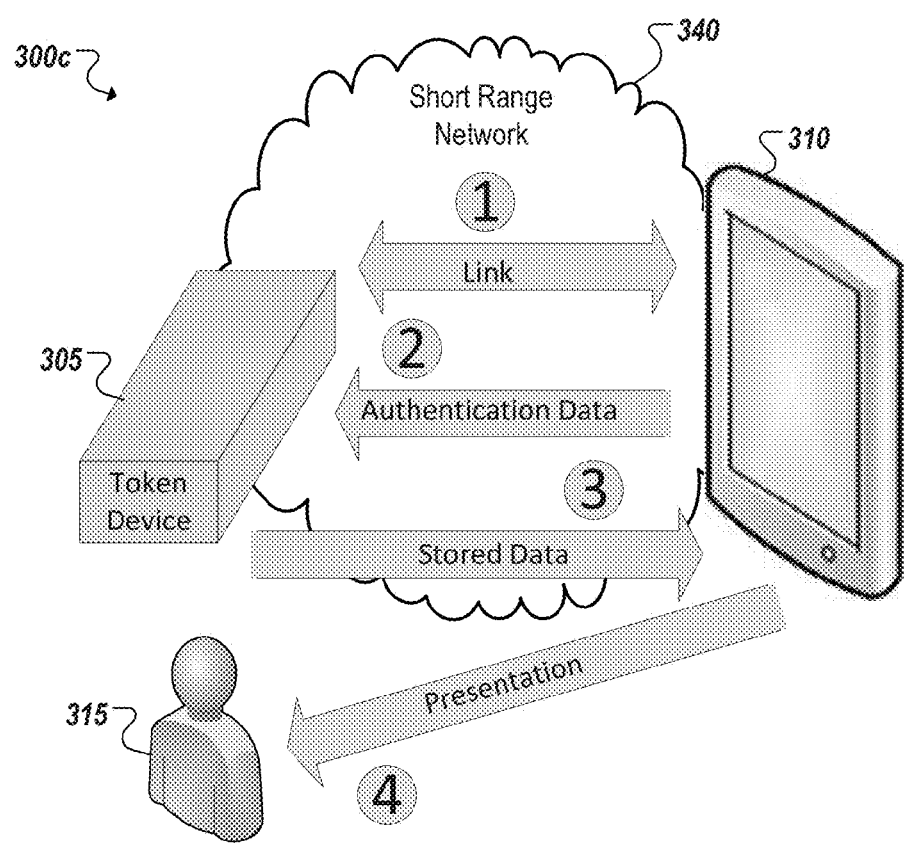

Turning to the block diagram 300c of FIG. 3C, in some instances, a wireless token device 305 can provide a cooperating computing device 310 with data stored on the wireless token device 305. Such data can include passwords, encryption keys, files, applets, programs, data objects, and other data for consumption or use by a cooperating computing device (e.g., 310). In a sense, in some instances, a wireless token device 310 can function as a wireless storage device for use by one or more cooperating computing devices 310. To protect access to the data stored on the wireless token device 305, access to the data can be restricted to authenticated cooperating computing devices. For instance, authentication data, such as a digital signature or token can be provided to the wireless token device 305 by the cooperating computing device 310 to authenticate the cooperating computing device at the wireless token device 305. In some examples, particular cooperating computing devices can be authenticated to and access only a portion of the data stored on a particular wireless token device, while other cooperating computing devices can be authenticated to and access other portions (or all sharable) data stored on the wireless token device.

In some instances, cooperative interaction between a wireless token device 305 and a cooperating computing device 310 can include a pairing or mutual authentication, with authentication data be exchanged to both authenticate the wireless token device to the cooperating computing device (e.g., as in the examples of FIGS. 3A-3B) and authenticate the cooperating computing device to the wireless token device or particular data stored on the wireless token device. Further, multi-factor authentication can be applied to authenticate either or both the wireless token device (as in the example of FIG. 3B) and the cooperating computing device. For instance, in some examples, a user can enter authentication information (e.g., a password, voice sample, etc.) to corroborate authentication data, such as a digital signature of the cooperating computing device, sent from the cooperating computing device to the wireless token device. Indeed, in some examples, user-provided data can be encapsulated in authentication data sent by the cooperating computing device to the wireless token device, such as by encrypting the user-provided password using a private key of the cooperating computing device.

Upon authenticating that the cooperating computing device 310 is trusted to access data stored on the wireless token device 305, the wireless token device 305 can send data 320, to which the cooperating computing device 310 is authenticated, over the short-range network to the cooperating computing device 310 for consumption by the cooperating computing device 310. In some examples, cooperating computing device 310 can load the data 320 to execute a program on cooperating computing device 310 or load the data for use by an application installed on the cooperating computing device 310, among other examples. For instance, data 320 can include files for consumption using office productivity software or other programs executed on the cooperating device. Cooperating computing device 310 can render data 320 received by the wireless token device 305 for presentation to the user 325 acting as the holder of the wireless token device 305 and user of cooperating computing device 310. In other instances, data 320 can include executable files that can be authenticated to and executed by cooperating device 310.

Figure 3D:
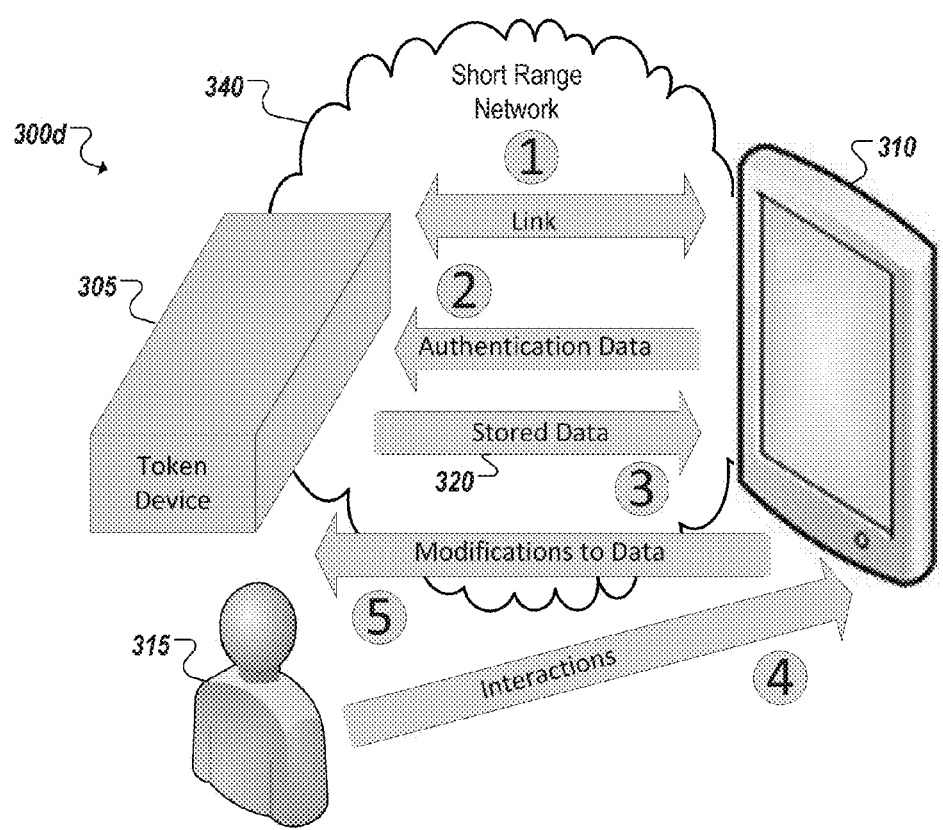

As shown in the example of FIG. 3D, in some examples, a user 315 can interact with a user interface of the cooperating computing device 310, such as a graphical user interface or audio/voice interface to thereby interact with, manage the use of, and in some cases modify the data 320 accessed by the cooperating computing device 310 from the wireless token device 305. For instance, a user can interact with data 320 accessed by cooperating computing device 310 and presented to the user 315 using user interfaces of the cooperating computing device 310. These user interactions can include requests to edit, supplement, delete, and other modify the data (i.e., 320) presented on cooperating computing device 310. Such changes can be communicated to the wireless token device 305 to update the data 320, as stored on the wireless token device, in accordance with the changes to the data 320 made at the cooperating computing device 310. Cooperating computing device 310 can temporarily store a copy of received data 320 and make changes to the copy of data 320 in accordance with received user interactions with the data 320. In some cases, cooperating computing device 310 can communicate the modified copy of the data 320 to the wireless token device 305 (for instance, at the close of access session using cooperating computing device 310) and the communicated copy can overwrite, at the wireless token device 305, the original data. In other instances, cooperating computing device 310 can communicate a record indicating the changes (i.e., a delta) to be made to the stored data 320 at the wireless token device 305 to bring the wireless token device's copy of data 320 into accordance with a copy of the data 320 modified at cooperating computing device 310 through interactions of a user 315.

Further, in some implementations, cooperating computing device 310 can provide continuing, real-time, periodic, or otherwise multiple communications of data modifications to wireless token device 305 for use by the wireless token device 305 in updating the data 320. A user 315, and holder of wireless token device 305, in some examples, can first use wireless token device 305 to begin accessing data (e.g., 320) stored on the wireless token device 305 using a first cooperating computing device 310, and then interrupt the use session to move to another second cooperating computing device, using the second computing device to continue modifying the data 320, picking up where the user left off using the first cooperating computing device. Indeed, the wireless nature of wireless token device 305 makes the ability to easily migrate from one computing device (and user interface) to another, including different computing devices separated from each other by some distance.

Figure 3E:
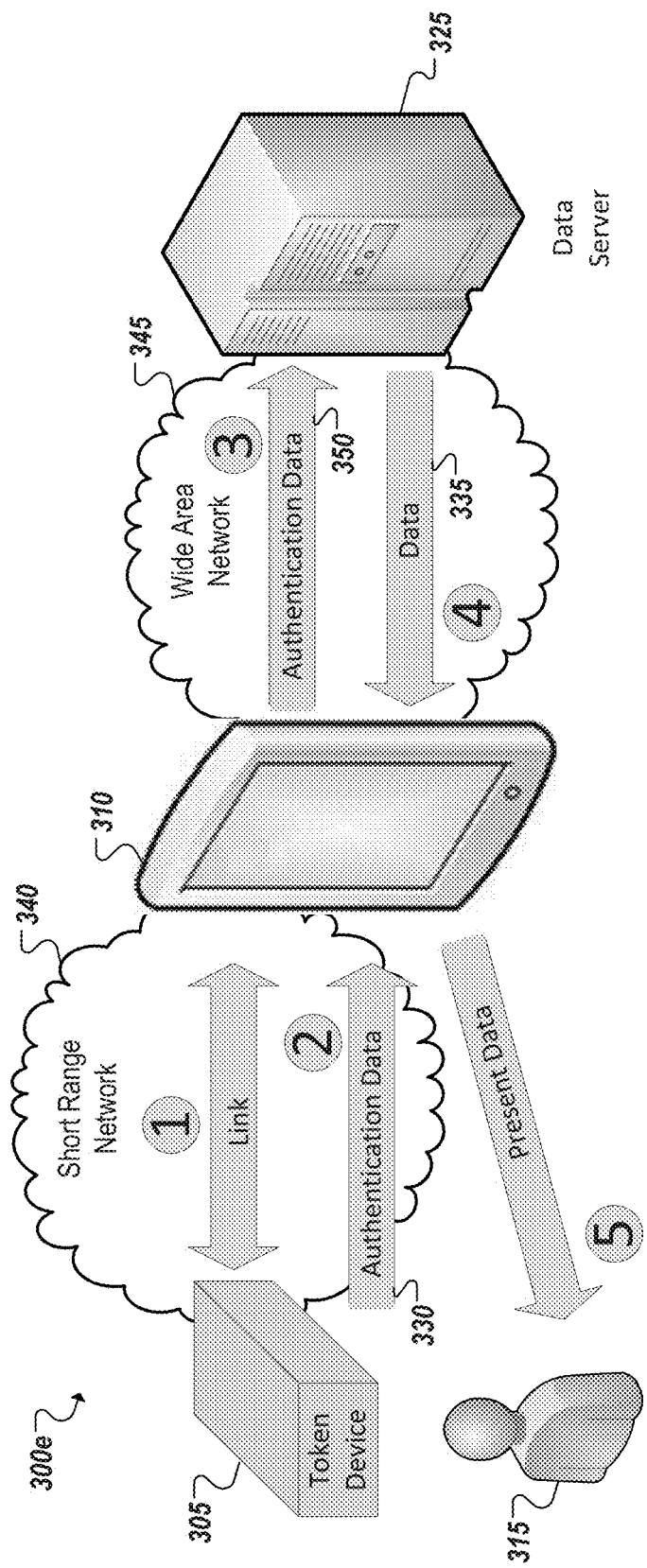
Figure 3F:
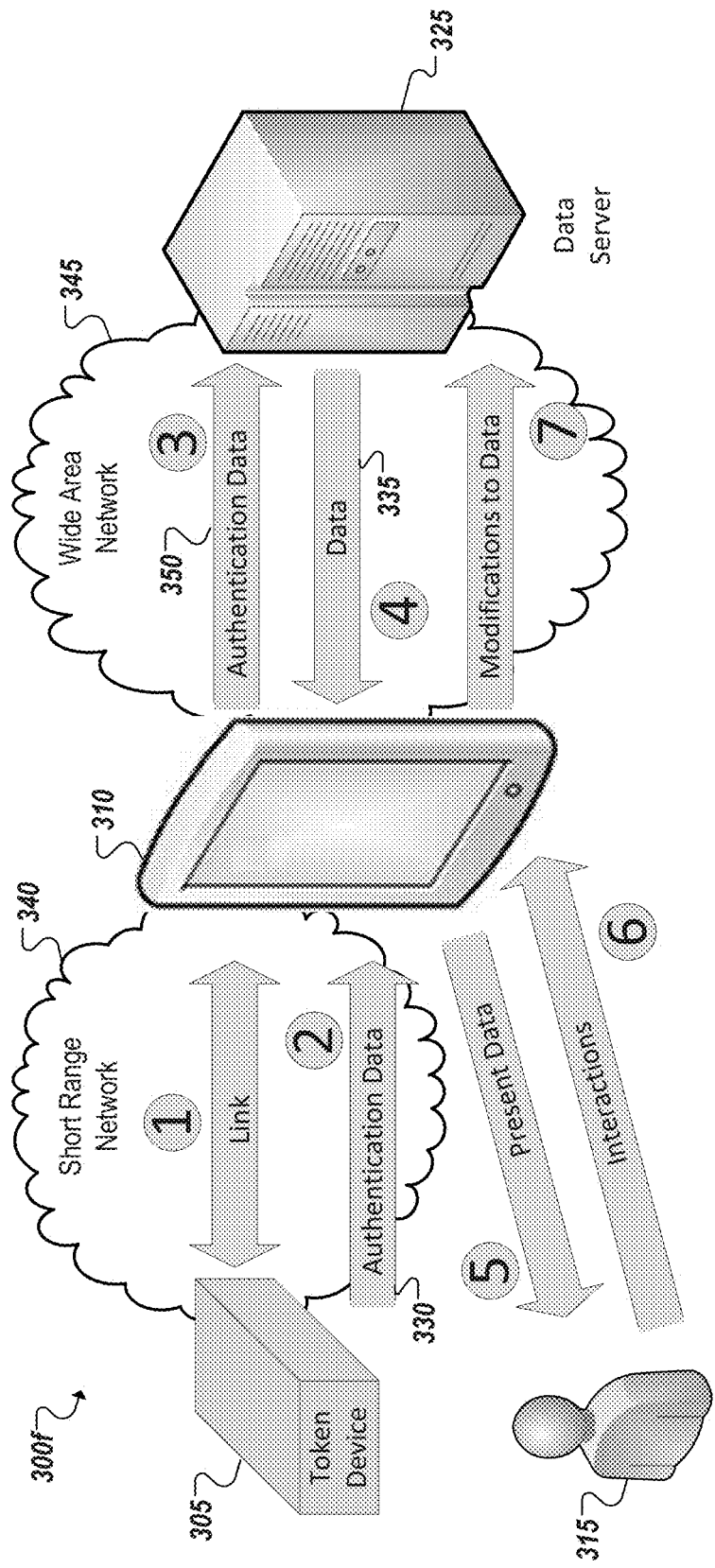

As shown in the examples of FIGS. 3E-3F, in some implementations, a wireless token device 305 can be used to not only authenticate a user to use of a particular cooperating computing device 310 and data and programs stored locally on cooperating computing device 310, wireless token device 305 can be used to authenticate to remote data stores (e.g., 325), including cloud-based data storage system, accessible over wider area networks (e.g., 345), including global networks such as the Internet. Turning to FIG. 3E, a wireless token device 305 can send authentication data 330 that is adapted to authenticate the holder of the wireless token device 305 to data (e.g., 335) maintained and served at a remote data server 325. In some instances, authentication data 330 can include authentication data used to authenticate the wireless token device 305 (and thereby also its holder) to a cooperating computing device 310. The cooperating computing device 310 can use the received authentication data 330 to connect to the data server 325 and retrieve data 335 stored on the data server. Such data can include user-specific data, such as user's personal files, user profile data, and other data. In some examples, data 335 can include an image of user profile data usable across a variety of different (cooperating) computing devices (e.g., 310), allowing a user to maintain a common set of data allowing a desktop environment of the user to be mirrored (and accessed) across each of a plurality of devices held by the user.

In some examples, each of a plurality of particular computing devices (e.g., 310) such as smart phones, tablet computers, personal laptops, workplace computer, etc. can be registered with data server 325 and authentication data 350 used to authenticate to the data 335 stored at data server can be maintained locally and securely at each of the registered devices. In such examples, a user can gain access to remotely-stored data 335 by authenticating to the particular computing device using a corresponding wireless token device using principles similar to those described in connection with the examples of FIGS. 3A-3B. In such instances, the wireless token device 305 authenticates an authorized user 315 to use a corresponding cooperating computing device (e.g., 310) as well as the authentication data 350 for use in authenticating users to data maintained remote data store 325.

In other examples, authentication to particular data maintained at a remote data store, such as a cloud-based data server, can be decoupled from particular cooperating computing devices. This can be advantageous, among other reasons, in that it allows a user to access data (e.g., 335) stored on cooperating computing devices using theoretically any computing device capable of accessing and consuming the data 335, including public and other shared, multi-user computing devices. For example, in some implementations, authentication data 330 can include authentication data 350 maintained at wireless token device 305. To secure authentication data 350, authentication data 350 can be encrypted, for instance, so that only wireless token device 305 and remote data storage system 325 are able to access the authentication data 350 in the clear. In other instances, one-time passwords (such as rooted in hardware), randomized authentication data, or other perishable or variable authentication data can be utilized, preventing reuse of the authentication data by the cooperating computing device when not in the presence of the wireless token device 305.

In either instance, upon authenticating to data server 325 using authentication data 350, at least some of the data (e.g., 335) authenticated to using authentication data (based on authentication of an authorized user using wireless token device 305) can be communicated to the cooperating computing device 310 for consumption using cooperating computing device 310. For instance, data 335 can be rendered and presented to the user 315 via a user interface of the cooperating computing device. Further, as in previous examples, and as illustrated in FIG. 3F, a user, in some instances, can interact with data 335 presented on the user interface of cooperating computing device 310. Such interactions, as in previous examples, can include request to modify the data 335, triggering corresponding modifications of the data as stored at data server 325. For instance, a copy of the data 335 as maintained by and modified using cooperating computing device 310 can be communicated back to the remote data server to overwrite the previous version of data 335. In other instances, cooperating computing device 310 can maintain a connection with data server and access and modify the data 335 directly from the remote data server, communicating user interactions affecting the data 335 to the remote data server, thereby changing the data directly at the remote data server 325, among other examples.

As noted above, as the collection of devices used and possessed by a user increase, the potential that one of these devices is lost, stolen, or is subject to unauthorized accessed increases. Further, as the size of computers decreases and their mobility increases, the opportunity for loss increases. Given the expanding feature set of such devices, and users' reliance on them, users can suffer great harm from device or data loss. By providing a token device easily wearable by or otherwise physically connectable to a user (i.e., devices small in size, without space-intensive tactile interface or graphical displays), authentication to and protection of multiple user computing devices can be more intimately and physically tied to a user. Indeed, as shown in the example of FIG. 4, a single wireless token device can be provided for authenticating to multiple user computing devices.

Figure 4:
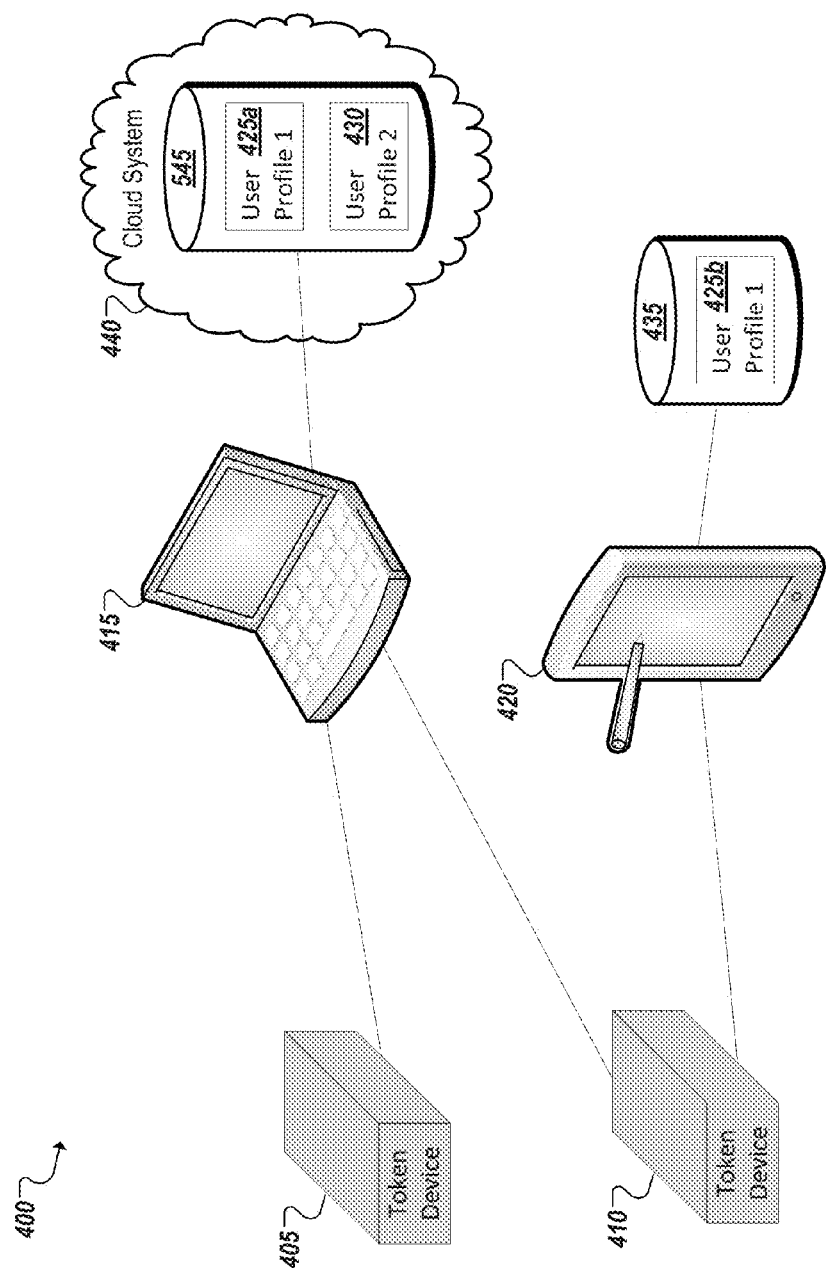
FIG. 4 is a simplified block diagram of example wireless token devices and example cooperating computing devices in accordance with some embodiments.

As illustrated in FIG. 4, a single wireless token device (e.g., 405) can operate cooperatively with multiple different cooperating devices (e.g., 415, 420). Similarly, a single cooperating device (e.g., 415) can operate cooperatively with multiple, different wireless token devices (e.g., 405, 410). For instance, a user of a single wireless token device (e.g., 405) can authenticate to multiple cooperating devices and utilize the devices to accept inputs or present outputs of data on behalf of (or authenticated to) through the wireless token device 405. For example, a user can carry or wear a wireless token device 405, 410 throughout the day and may come in contact with or be in closest proximity to multiple different devices that a user can authenticate to and use. Indeed, a user can migrate from one device to another, authenticating automatically and even carrying over sessions from one device to another device based on the presence of the wireless token device 405. For example, a user can begin accessing and modifying data authenticated to using the wireless token device 405 (such as cloud-based data) while seated in front of a personal computer (e.g., 415) in one instance. In a subsequent instance, the user may wish to access or use the same data on a second, different cooperating computing device (i.e., while using or in proximity of the second cooperating computing device). For example, the user can access a device such as a notepad computer, portable media player, in-car navigation or media controller device, video game console, computer kiosk or other public computer, or another computing device adapted to render data and/or programs authenticated to using the wireless token device 405. Further, in some instances, a user can use a single wireless token device 405 to authenticate to and concurrently use multiple different computing devices, such as both the user's smartphone and the user's laptop computer.

As noted above, an example cooperating computing device (e.g., 415) can also be authenticated to and maintain relationships with multiple different wireless token devices (e.g., 405, 410). For example, in an office or household where multiple wireless token devices are owned and utilized (and associated with particular users), one or more computing devices can be used as cooperating computing devices shared between the multiple wireless token devices. Public, semi-public, or other shared computing devices can also be configured to connect to and provide I/O support to users based on the users' holding a respective wireless token device corresponding with the user. For instance, a user can be identified at a particular computing device, such as a shared office workstation, a university computer lab, an internet café, or other environment, based on the user's possession of a corresponding wireless token device. In still other examples, kiosk computing devices can be provided that are configured with touchpads, or other user interface devices, together with short range networking capabilities (e.g., using Bluetooth, WiFi, or another protocol), allowing the kiosk devices to connect to and serve as a public cooperating computing device for use by a plurality of different users. The kiosk can be customized to the particular user based on the detection of a particular wireless token device held by the user. In some implementations, a wireless token device can pair to a kiosk or other public or shared computing device, for instance using a once-only pairing (e.g., that does not result in credentials of the simplified mobile communication device being stored by the shared computing device). Further, use of a shared computing devices by particular users can be tracked and/or monetized based on the detection of users' corresponding wireless token devices, so that users of the devices can access the shared computing device and be billed in accordance with their use of the device, for instance.

In some implementations, a wireless token device (e.g., 405) can be connected to and used by a particular cooperating computing device (e.g., 415, 42) to identify a particular user (i.e., of the wireless token device) and access profiles and other data (including files, application data, contact lists, email, histories, and other data associated with or authorized for access by the particular user) (collectively "user profile data" (e.g., 425a, 425b, 430)) corresponding to the authenticated user. For example, particular user profile data (e.g., 425a, 425b, 430) can be accessed using particular cooperating computing devices (e.g., 415, 420). In some instances, particular user data (e.g., 425b) corresponding to one or more users can be stored locally in memory (e.g., 435) of a cooperating computing device and made available upon authentication of the corresponding user. For example, a first user of a wireless token device 405 can utilize the wireless token device 405 to authenticate the first user on a first cooperating computing device 420 to access particular user profile data 425b stored on the device 420.

In some examples, multiple, different user profiles 425a, 430, each associated with a different user (via an associated wireless token device (e.g., 405, 410)) can be accessed using a single cooperating computing device (e.g., 415). For example, cooperating computing device 415 can establish a connection with one of a plurality of wireless token devices 405, 410 and authenticate a user to the cooperating computing device 415 based on authentication data received from the respective wireless token device. Through the authentication data (and/or user identification data) received from the respective wireless token device, the cooperating computing device 415 can identify user profile data for the corresponding user, including files and data with access restricted to the corresponding user. Such profile data can be included among a plurality of profiles, and stored locally on the cooperating computing device. In other instances, the user profile data can be accessible from a remote storage system (e.g., 440) and the authentication data received from the wireless token device can be used to authenticate the cooperating computing device' access to the remote data store.

In still further examples, the use of remote or cloud-based user profile data stores can allow a user to provision one of a plurality of different devices with user profile data. In one implementation, wireless token devices (e.g., 405, 410) can provide authentication data to one of a plurality of cooperating computing devices allowing the cooperating computing device to retrieve user profile data from a remote data store (e.g., 445) and provision the cooperating computing device with the user profile data. In some instances, provisioning the cooperating computing device can serve to at least temporarily cause the cooperating computing device to mirror the personal settings and data present on the user's personal computer(s). Accordingly, through the use of a wireless token device, a user can move from one computing device to the next and allow their personal data to be provided (at least temporarily) on each of the devices. In some instances, the cooperating computing devices merely serve as a client for accessing and changing data that is stored and maintained at a cloud-based or other remote data store (e.g., 445). In either event, a user can easily make use of multiple computing devices, including devices not owned or normally used by the user, while enjoying access to their personal data and files securely based on access to the user's personal profiles and data being linked to the user's physical possession of (and in some cases authorization to) a wireless token device associated with the user.

In some instances, authentication of a user to a particular cooperating computing device can serve to allow access to user profile data (e.g., 425a, 430) stored remotely from the cooperating computing device and wireless token device (e.g., 405, 410). For instance, user profile data 425a, 430 for a plurality of users can be maintained in a distributed computing environment, such as server pools or cloud-based data storage environments (e.g., 440). The cloud session can allow data to persist between various cooperating devices authenticated to using the wireless token device. For instance, a user can begin typing an email or other document on a first cooperating computing device and move to a second cooperating computing device, maintaining the cloud session and allowing the user to access and continue drafting the incomplete email from the first cooperating computing device (i.e., so long as the user still possesses the corresponding wireless token device). A cooperating computing device (e.g., 415) can serve as a client to the data servers (e.g., 445) and utilize authentication data provided by a wireless token device (e.g., 405, 410) to gain authorization to access and/or be provisioned with data maintained by the cloud-based data store 445 for a user associated with the wireless token device. Alternatively, authentication data to cloud-based data store 445 can be maintained at the cooperating computing device (e.g., 415), with the authentication data of the wireless token device 405 serving to unlock use of the cooperating computing device 415 and thereby also the data in data store 440 or the cooperating computing device's access to remote data stores (e.g., 445).

Figure 5A:
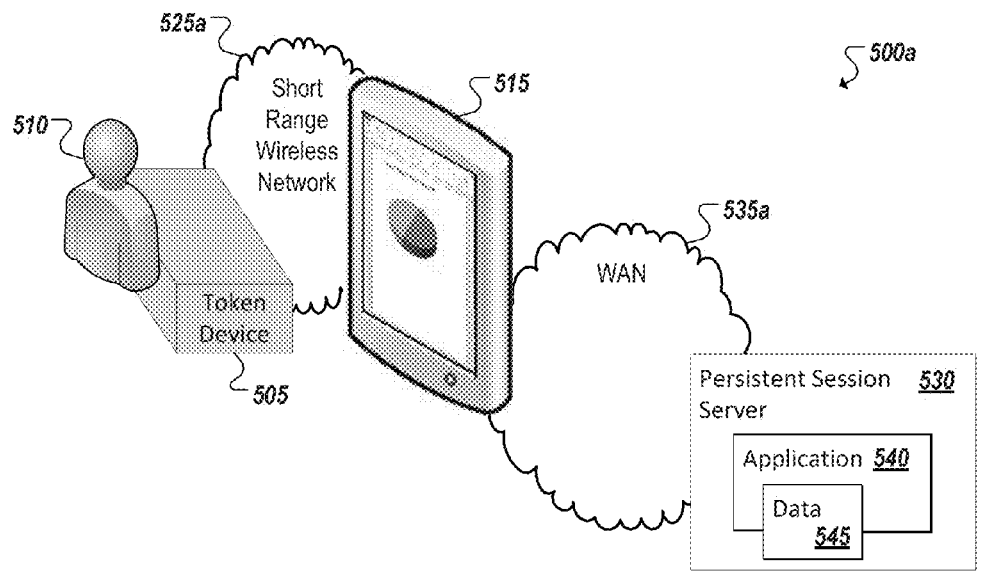
Figure 5A:
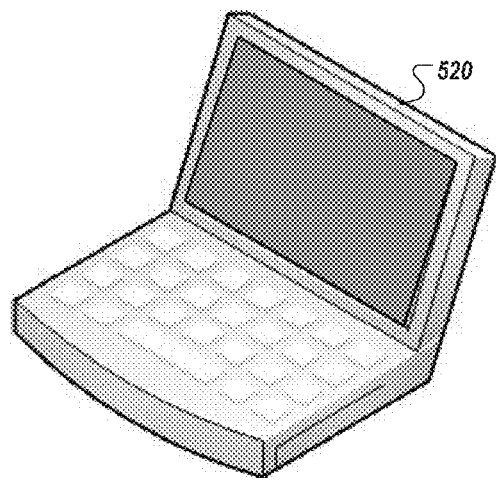
Figure 5B:
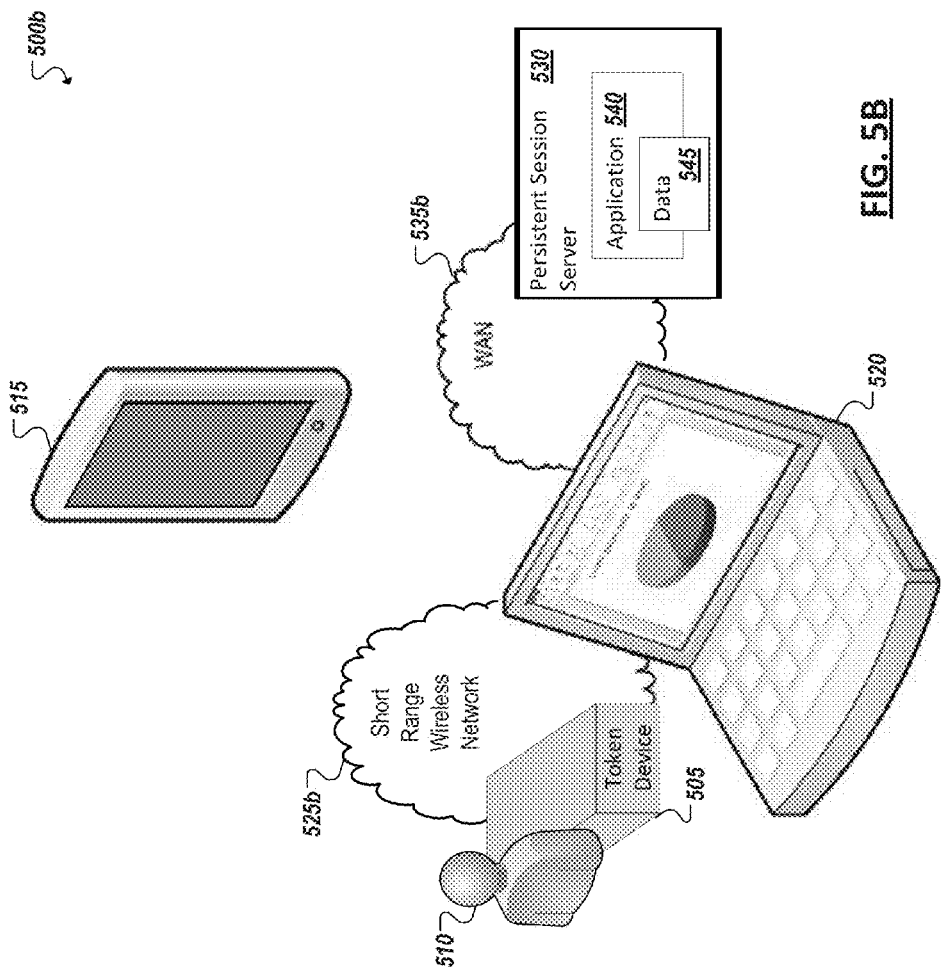

FIGS. 5A-5C are simplified block diagrams 500a-c illustrating some example configurations for using wireless token devices in connection with a persistent computing session. For instance, as shown in FIG. 5A, a token device 505 carried by a particular user 510 can connect to nearby computing devices, such as tablet computer 515, over a short range wireless network 525a. The token device 505 can send authentication data over the short range wireless network 525a to the tablet device 515 for use by the tablet device 515 in authenticating to a persistent computing session hosted by a remote persistent session server 530. The token device 505 can be used to conveniently and automatically authenticate the user 510 to a persistent computing session to which users of token device 505 are authorized to access. Further, as in some of the examples detailed above, in addition to providing authentication data for a persistent computing session, a wireless token device 505 can further authenticate a user 510 to the cooperating computing devices (e.g., 515, 520) themselves, as well as user profile data and other resources accessible through the cooperating computing devices (e.g., 515, 520).

Persistent session server 530 can serve applications, data, and other services to client computing devices over a wide area network (WAN) 535a, such as the Internet. One or more software applications, services, or systems (e.g., 540) can be made available to users in a persistent computing session. Such an application 540 and persistent computing session can include such examples as a web-based email client, streaming media player system, video gaming system, office productivity session, video teleconference, among other examples. Particular data 545 can be used in the persistent session. The data 545 can be associated with a particular user (e.g., user 510) and corresponding user profile, and access and use of the data 545 can be limited to users able to provide particular authentication data (e.g., using wireless token device 505) for use by the persistent session server 530 in authorizing access to the persistent computing session by one or more client computing devices (e.g., 515, 520).

In the example of FIG. 5A, a user 510 utilizes wireless token device 505 to send authentication data maintained at the token device 505 to tablet computer 515 for forwarding to the persistent session server 530 over network 535a. By so doing, the user 510 can cause tablet computer 515 to be authenticated to and join the persistent computing session, allowing the user to begin (or continue), at a first instance, consuming resources and services provided through the persistent computing session using the tablet computer 515. Turning to FIG.

5B, the user 510, while the computing session persists, may choose to switch devices during the session for any variety of reasons, such as low battery power of the first device (e.g., 515), to utilize enhanced capabilities of another computing device, because the user has changed locations (e.g., moved to the location of the other computing device), because another user wants to take control of the first device, among other examples. In the example of FIG. 5B, a user 510 has moved (with wireless token device 505) from the tablet computer device 515 to laptop computer device 520. Upon bringing the wireless token device 505 within range of the laptop computer 520, wireless token device 505 and laptop computer 520 can discover one another over a short range wireless network 525*b* and wireless token device 505 can communicate authentication data to the laptop computer 520 allowing laptop computer 520 to then forward at least a portion of the received authentication data to persistent session server 530 (e.g., over network 535*b*) and authenticate to the same persistent computing session accessed by tablet computer 515. In this way, a user 510 can migrate between devices during a single persistent computing session, provided the user 510 is in possession of wireless token device 505.

In some implementations, when a second cooperating computing device (e.g., 520) joins a persistent computing session in-progress, the second cooperating computing device can begin consuming the resources available in the session at that moment and, effectively, pick-up (or join) where the first cooperating computing device (e.g., 515) left off when the second cooperating computing device joined the session (or when the first cooperating computing device left the session). In some instances, UIs of the first and second cooperating computing devices can present resources of the persistent computing session to the user 510, for instance, via speakers, graphical displays, and the like. In some instances, the UI capabilities of two different cooperating computing devices can be substantially similar and the persistent computing session can be presented to and interacted with by the user in substantially the same manner on each device. In other instances, a first cooperating computing device (e.g., 515) first used by a user in a persistent computing session can possess different UI capabilities, as well as different data storage capabilities, software applications, operating system, etc. than a second, different cooperating computing device (e.g., 520) later (or concurrently) used by the user 510 in the same persistent computing session. Consequently, presentation of resources of the persistent computing session can be different from client device to client device (e.g., 515 vs. 520). Additionally, software and hardware on each respective device can change how a user is able to interact with and consume resources within the persistent computing session. Such differences can include the screen size and resolution of each cooperating computing device's respective display device (e.g., influencing how GUIs of the persistent computing session are rendered on the respective devices), the types of UIs available to the user for participating in the persistent computing session (e.g., a keyboard, web camera, touchscreen, microphone, or other interface available on one device that may not be available on another), network communication capabilities (e.g., where one device possesses cellular communication capabilities allowing a user to place a cell phone call in connection with the persistent session), software capabilities (e.g., the presence of particular applications able to edit, access, render, save, etc. particular types of files and data served in the persistent session), among other examples.

Such differences between cooperating computing devices can influence how a user chooses to utilize different devices within a single persistent computing session, as well as how the persistent session server 530 interacts with each device. Accordingly, in connection with joining a persistent computing session, in some examples, device identification data can be shared with the persistent session server 530 that can be used by the persistent session server 530 to identify the respective capabilities and type of each device participating in the persistent session. Indeed, the persistent session server 530 can tailor data and resources served in the session based on an identification of the corresponding type or capabilities of a participating cooperating computing device. In some instances, the device identifier can identify such capabilities as installed operating system, applications, display resolution characteristics, user interface and other hardware capabilities, among other examples. Further, in some examples, device identifier data can be sent together with or embedded in authentication data sent (or forwarded) from the participating cooperating computing device to the persistent session server 530. Indeed, full authentication of a particular device can be further conditioned on determining (e.g., from the device identifier data and other information) whether the device possesses a minimum level of system requirements and other characteristics for participating in the persistent computing session. In other instances, device identifier data can be sent after authenticating a particular cooperating computing device and apart from the authentication data.

As in other examples described herein, authentication of a wireless token device 505 and/or cooperating computing device (e.g., tablet computer 515, laptop computer 520) to a persistent computing session can be based on a prior registration or pairing between the wireless token device (and/or cooperating computing device) and the system hosting the persistent computing session (e.g., persistent session server 530). In some implementations, the first time a wireless token device 505 attempts to authenticate to a remote persistent session server 530 (i.e., through a cooperating computing device (e.g., 515, 520)), a pairing routine can be completed to mutually authenticate, or pair, the devices to the each other. For instance, digital certificates can be generated by each of the wireless token device 505 (and/or cooperating computing device) and persistent session server 530, and combined with the public key of the other device for use in pairing and establishing a trusted relationship between the two cooperating devices without requiring the GUUID (or other keys) to be explicitly shared between the devices. Other techniques can also be employed to pair, register, or otherwise establish a relationship between a wireless token device (and/or cooperating computing device) and the persistent session server 530. Pairing the devices can also establish how the devices communicate and authenticate in the future.

In some implementations, upon removing token device 505 from the presence of a first cooperating computing device (e.g., tablet computer 515) for use of the token device 505 with a second cooperating computing device in the same persistent computing session, the first device's participation in the persistent computing session can be deconstructed and terminated. For instance, if the wireless token device 505 is no longer collocated with tablet computer 515 and able to communicate with tablet computer 515 over short range wireless network 525*a*, the tablet computer 515 can be disassociated with and logically disconnected from the persistent computing session.

In some instances, a particular cooperating computing device can be authenticated and re-authenticated during the duration of the particular cooperating computing device's participation in a persistent computing session. The authentication and each re-authentication can be based on authentication data originating from a wireless token device (e.g., 505). For instance, wireless token device can send a series of different authentication data expected by the persistent session server 530 during the session. The series of authentication data can be pre-negotiated by the wireless token device 505 in connection with a registration, or pairing, of the wireless token device with the persistent session server 530. For instance, each authentication data package sent by the wireless token device for use in a persistent computing session can be numbered, time-stamped, or otherwise tagged according to a protocol established between the wireless token device 505 and persistent session server 530 (e.g., during a pairing of the wireless token device 505 with the persistent session server 530) and the tag can be encrypted so that only the persistent session server can read and authenticate the tags (and remaining authentication data) in the clear. Accordingly, if a participating cooperating computing device (e.g., 515) is no longer communicating with wireless token device 505 (e.g., over a short range network 525a), the cooperating computing device will not be able to receive or forward the most recent (re)authentication data and can be removed from the session by the persistent session server 530. In other examples, upon detecting that a wireless token device 505 is no longer in communication with a participating cooperating computing device (e.g., 510), the cooperating computing device can send a message to the persistent session server 530 alerting the persistent session server 530 that the cooperating computing device is no longer collocated with the wireless token device 505, the cooperating computing device, in essence, voluntarily removing itself (i.e., terminating) from the persistent computing session based on the removal of the wireless token device 505 from the presence of the cooperating computing device.

In other examples, authentication data for authorizing a particular cooperating computing device's participation in persistent computing sessions hosted by a persistent session server 350 can be maintained at the particular cooperating computing device (e.g., at 515, 520) and access to and transmission of the authentication data to the persistent session server can be unlocked conditioned on the wireless token device (e.g., 505) authenticating to the cooperating computing device (e.g., 515, 520). For instance, a wireless token device 505 can send first authentication data to a cooperating table computer 505 to authenticate the user (e.g., 510) to the tablet computer 515 and/or second authentication data maintained on the tablet computer 515 (e.g., consistent with some of the authentication principles of other examples illustrated and discussed above). The second authentication data, in some examples, can be specific to the tablet computer 515 and based on a particular pairing of tablet computer 515 and persistent session server 530. Further, upon recognizing that the user 510 is authorized to access the second authentication data, the tablet computer 515 can use the second authentication data to authenticate to the persistent session server, thereby allowing the user 510 to consume resources of the persistent session server using the table computer 505. Additionally, third authentication data can be maintained on laptop computer 520 (e.g., based on a particular pairing of laptop computer 520 and persistent session server 530). Authentication of the user 510 to the laptop computer 520 (i.e., using authentication data from wireless token device 505) can then unlock use of the third authentication data to authenticate a user's (e.g., 510) use of the laptop computer 520 within the persistent computing session.

Turning to FIG. 5C, in some examples, a user can utilize multiple computing devices in connection with and during the course of the user's participation in a persistent computing session. Further, in some implementations, by concurrently collocating a wireless token device (e.g., 505) with multiple cooperating computing devices (e.g., 515, 520), the wireless token device 505 can engage in two or more concurrent communication sessions which each of the collocated cooperating computing devices (e.g., 515, 520) to provide each device with respective authentication data for use in connection with authorizing the user's 510 access to the persistent computing session and the user's use of each of the two or more cooperating computing device, as illustrated in FIG. 5C. In some instances, a user may desire the concurrent use of two different computing devices within a single persistent computing session, for instance, to supplement the capabilities and features of one device with those of another. While the block diagram 500c of FIG. 5C shows each of devices presenting substantially similar GUIs, in some instances, the differences between the concurrently participating cooperating computing devices can result in varied presentations of the same persistent computing session based, for instance, on the respective differences in the capabilities of the device. Similarly, in other instances, a single wireless token device 505 can be used to authenticate a user's participation in multiple different persistent computing sessions, using one device to consume each of the multiple different sessions, or multiple different devices (communicating with wireless token device 505) each participating in a different one of the multiple different sessions.

Figure 6A:
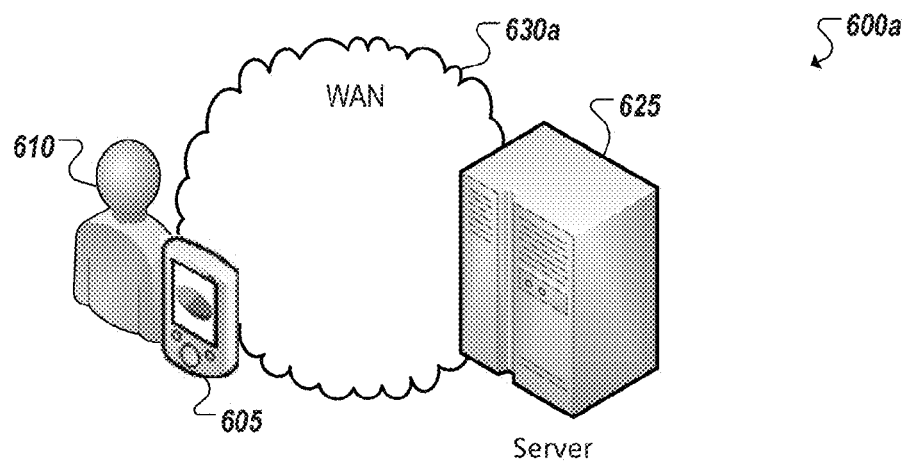
FIGS. 6A-6E are simplified block diagrams of example wireless token devices and example cooperating computing devices in accordance with some further embodiments.
Figure 6A:
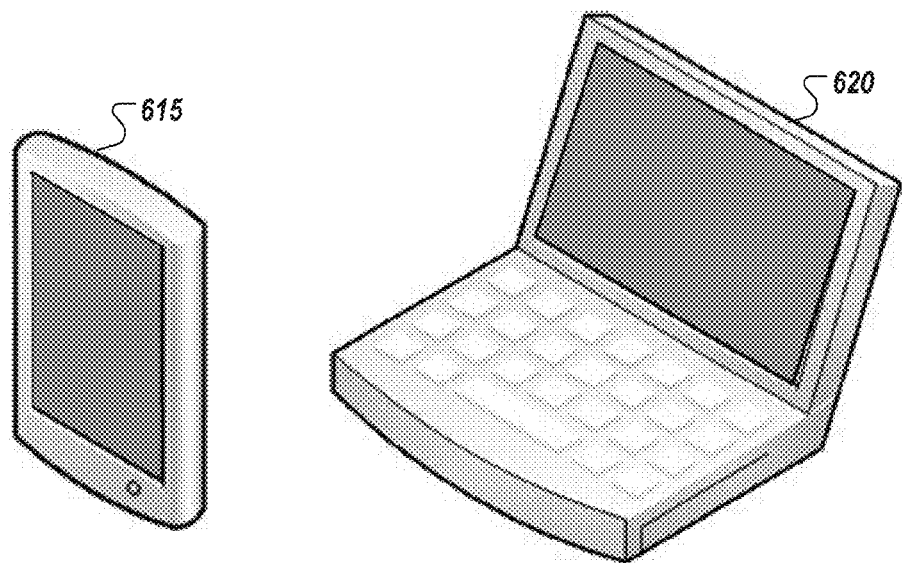
Figure 6B:
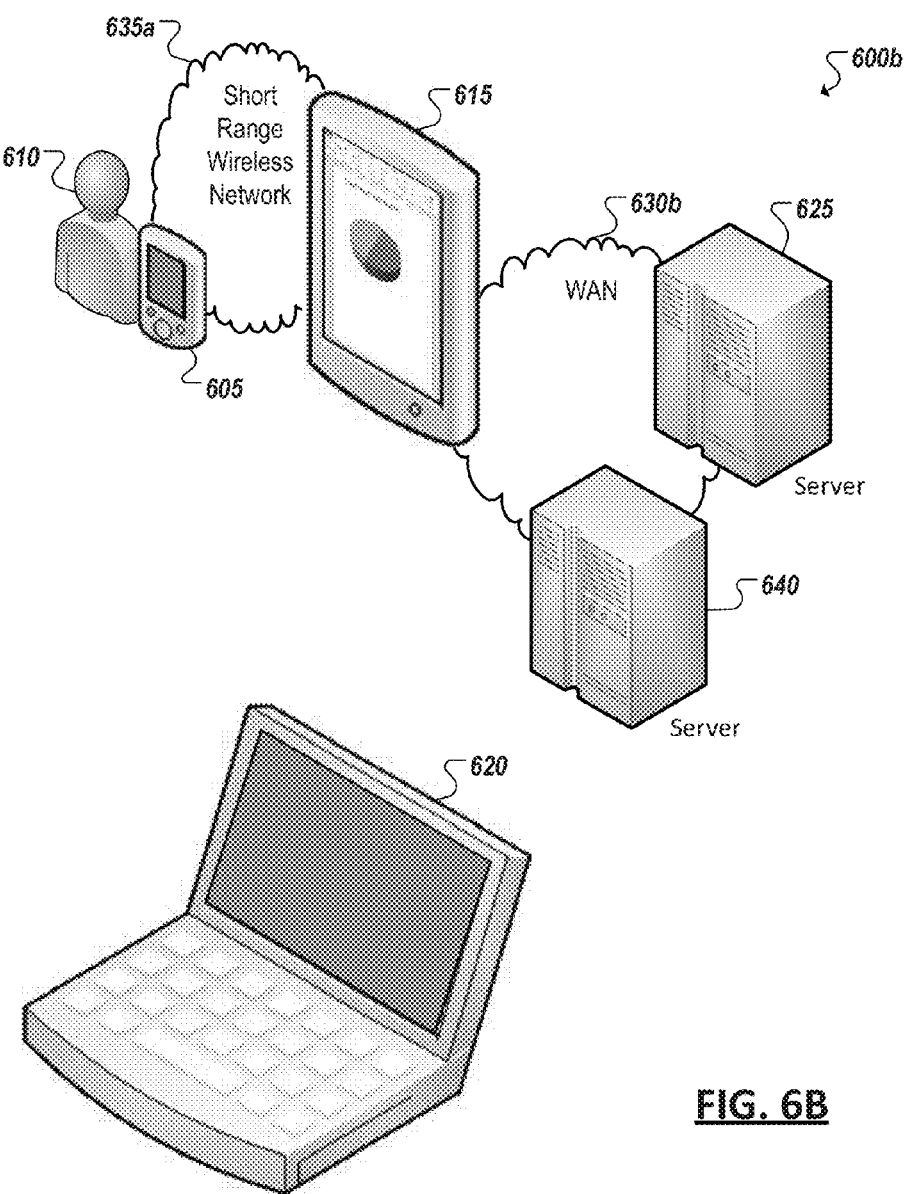
Figure 6C:
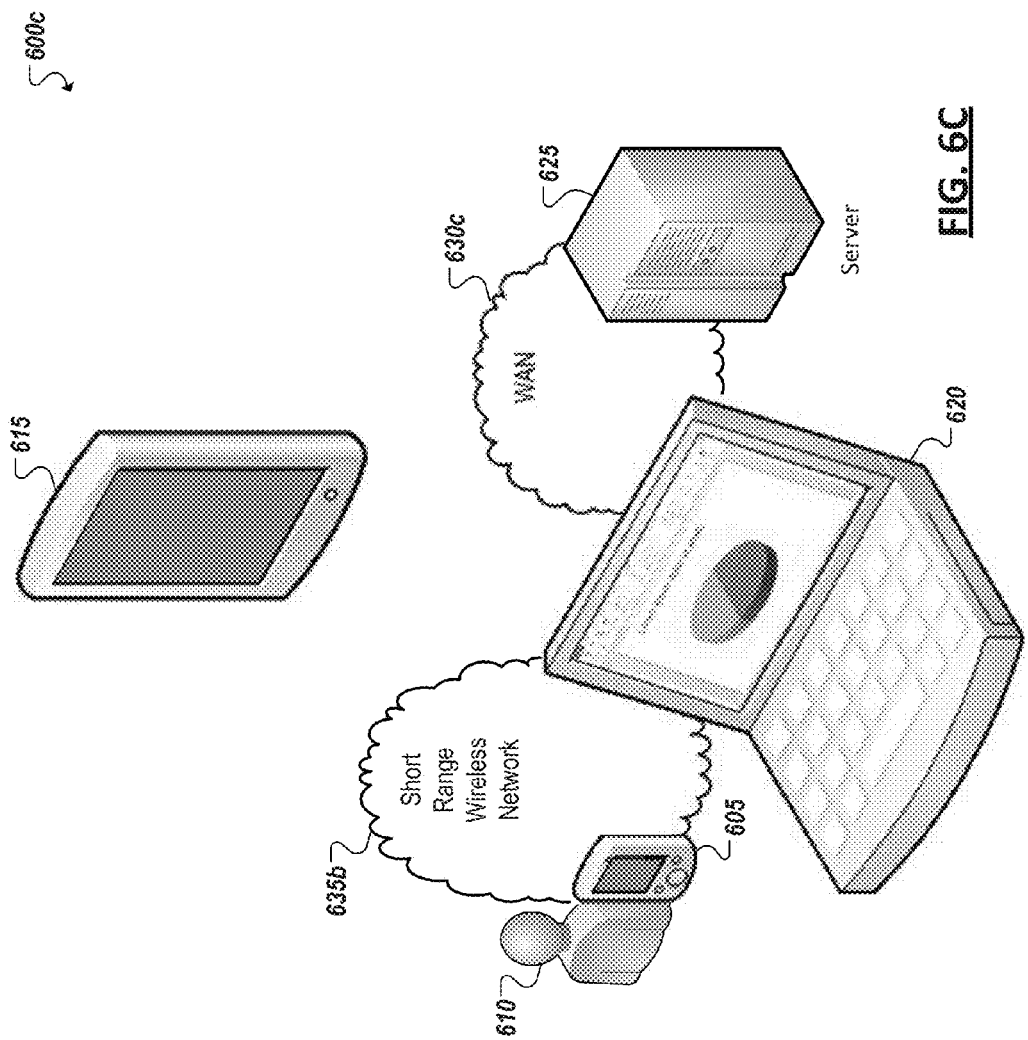

Turning to FIGS. 6A-6C, simplified block diagrams 600a-c are shown of example implementations of wireless token devices embodied in (and doubling as) more robust personal computing devices, such as a cell phone, smart phone or other easily portable computing device. For instance, in one particular example, a smartphone (or other) device (e.g., 605) can store authentication data for use in authenticating a user to other computing devices (e.g., 615, 620) and/or authenticating to data, applications, and computing sessions (including persistent computing sessions) accessible through other cooperating computing devices (e.g., 615, 620). Further, in some examples, a feature-rich wireless token device, such as the smartphone 605, can itself possess functionality for directly consuming at least some of the data and services that a cooperating computing device can. Further, a feature-rich wireless token device can possess more robust communications capabilities allowing the wireless token device to connect to and communicate over longer range networks, including the Internet, in addition to connections over short-range wireless networks (i.e., in connection with its authentication activities, described in detail above). In such instances, a feature-rich wireless token device can utilize such wide area network communication capabilities to, among other things, update, acquire, and otherwise manage authentication data stored on the wireless token device for use in authenticating the wireless token device's holder to various other devices, data, and services.

In the example of FIG. 6A, a user 610 can take advantage of the network communication capabilities of wireless device 605, such as broadband cellular communication capabilities, to access data, services, and other resources served by a remote server 625, such as a web-based server, over a wide area network 630a. Turning to FIG. 6B, the wireless device (e.g., smartphone 605) can be collocated with another computing device, such as tablet computer 615, and communicate over a short range network 635a to both identify that the devices are within range of each other, and to communicate authentication data stored on the feature-rich smartphone device 605 from the smartphone 605 to the tablet computer 615. The authentication data, similar to other examples discussed and illustrated above, can be used to authenticate the holder (e.g., 610) of the feature-rich token device (smartphone 605) to the tablet device 615, and/or peripherals attached to the tablet device 615, servers (e.g., 625, 640) and services accessible to the tablet device, and private data accessible using the tablet device 615 (including data stored on either tablet device 615 or servers 625, 640).

In some instances, a user 610 can consume and authenticate to persistent computing sessions, remote data stores, cloud systems, and the like using a feature-rich wireless token device (e.g., 605). Indeed, in some examples, a user 610 can utilize the features of a feature-rich wireless token device 605 to begin participating in a persistent computing session using the feature-rich wireless token device 605. When the user 610 brings wireless token device 605 into range of another potential cooperating computing device (e.g., 615), authentication data can be sent to the cooperating computing device 615 over a short range wireless network 635*a* for use by the first cooperating computing device 615 in authenticating to and joining (or replacing) the feature-rich wireless token device 605 in the same persistent computing session. Further, as in the examples of FIGS. 5A-5C, relocating the feature-rich wireless token device 605 to a different cooperating computing device, such as laptop computer 620 in the example of FIG. 6C, can cause the additional cooperating computing device (e.g., 620) to automatically authenticate to a server hosting the persistent computing session and supplement or replace a previously-used cooperating computing device (e.g., 615) authenticated to the session using a feature-rich wireless token device 605.

In some instances, a feature-rich wireless token device 605 may be able to communicate and access some of the services and resources served by systems (e.g., 625) also accessible to cooperating computing devices (e.g., 615, 620). In other instances, a feature-rich wireless token device may not be capable or configured to communicate with or utilize resources of other systems and servers (e.g., 640) that would otherwise be accessible using a cooperating computing device (e.g., 615, 620). In some implementations, cooperating computing devices can be closely associated with remote data servers and networks, such as instances where the cooperating computing device includes a set top box device, such as a cable or satellite set top box communicating with dedicated servers, such as a headend or headend in the sky server system, a video game system communicating with one or more dedicated video game servers or networks, and the like.

Figure 6D:
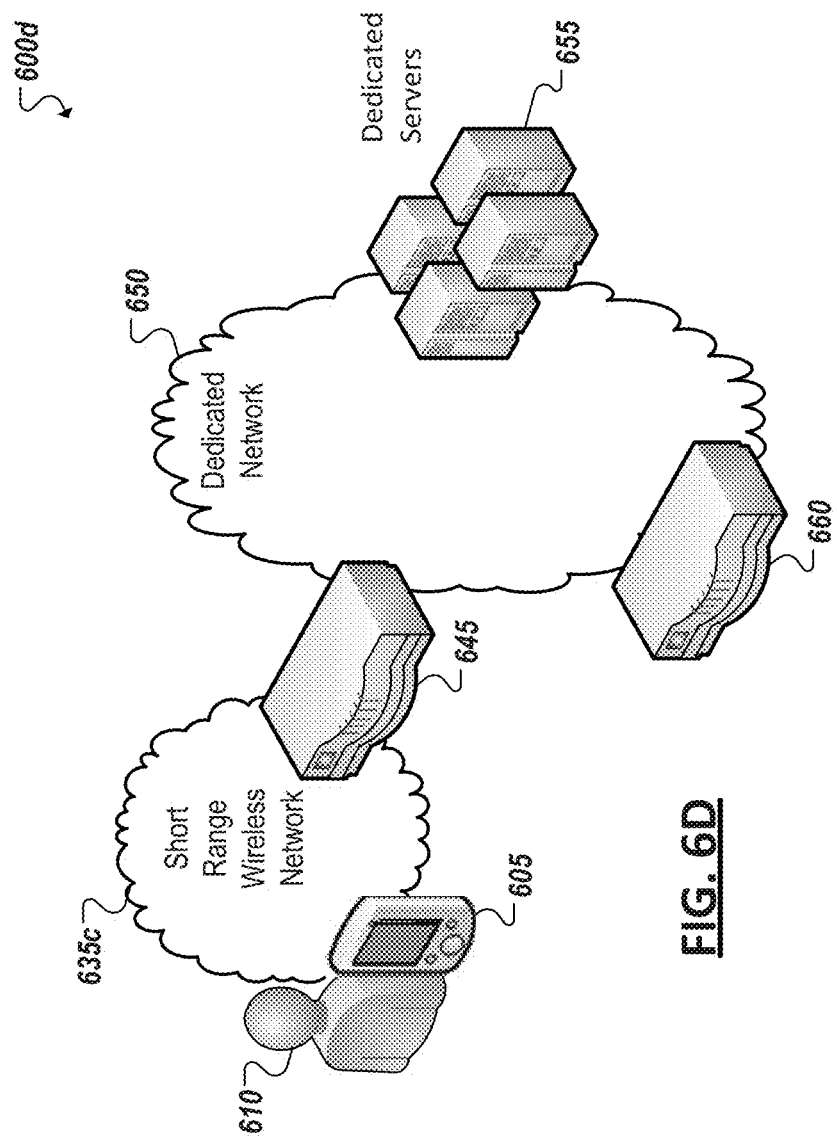
Figure 6E:
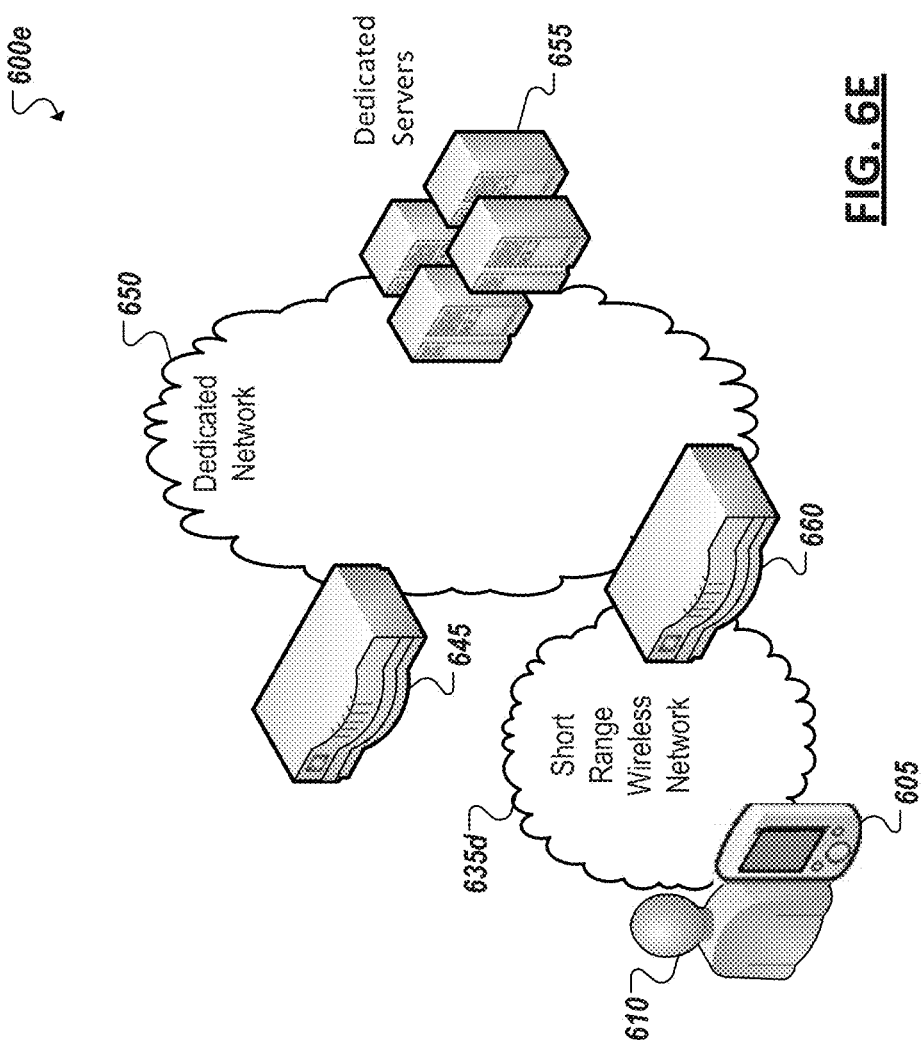

For instance, as shown in the example of FIGS. 6D and 6E, a user 610 carrying a wireless token device, including simplified or feature-rich wireless token devices (a feature-rich wireless token device is represented in the particular example illustrated in FIGS. 6D and 6E, although a simplified wireless token device could also be used), can be authenticated to a cooperating computing device 645 having a dedicated network (e.g., 650) connection to one or more dedicated servers (e.g., 655). The user 610, as shown in FIG. 6D, can collocate the wireless token device 605 with the cooperating computing device 645 and be authenticated to the cooperating computing device 645 and thereby also the network 650 through the sharing of authentication data stored on the wireless token device with the cooperating computing device 645 over a short range wireless network 635*c*, consistent with at least some of the principles outlined in other examples above. Further, authentication of the user 610 on the dedicated network 650, such as a cable or satellite television network, video game network, or other media network, can cause the settings, preferences, recordings, channel subscriptions, game data, etc. of the user 610 to be automatically loaded or otherwise made accessible to the user over cooperating computing device 645 based on the presence of the wireless token device 645. Further, as shown in FIG. 6E, the user 610 can move, with the wireless token device 605, to another location where another cooperating computing device (e.g., set top box 660) is present that also connects to the dedicated network 650. The user 610 can then use wireless token device 605 again authenticate to the network 650 over cooperating computing device 660 using short range wireless network 635*d* and have the user's same preferences, settings, subscriptions, recordings, etc. again made available to the user 610 (e.g., even when set top box 660 is not owned/leased by, present on the property of, or otherwise directly controlled by the user 610) allowing the user 610 to enjoy access to the services of the network 650 as if the user were at home using the user's own set top box, among other examples.

Further, in addition to at least partially unlocking data, applications, and functionality of a cooperating computing device through the sharing of authentication data by virtue of collocation of a particular wireless token device with the cooperating computing device, a particular wireless token device can also be used to authenticate a user to the peripherals of a cooperating computing device. For instance, a particular cooperating computing device, such as a laptop, may be connected, wirelessly or by wireline, to detachable hard drive devices, printers, disk readers, credit card readers, web cameras, monitors, and other peripheral hardware. In some instances, use of particular peripherals (such as a particular detachable hard drive, or space within that hard drive) can be disabled pending authentication of a user to the cooperating computing device using the particular wireless token device. In such instances, a simplified mobile communication device can serve as a key for unlocking multiple cooperating computing devices through a single authentication.

Wireless token devices can be physically embodied in a variety of ways, including simplified (i.e., non-feature rich) embodiments adapted to be conveniently and discretely worn, carried, or fixed to (or even embedded in) the wireless token device's authorized user. Such embodiments can include examples such as a necklace, a lapel clip or brooch, a watch, ring, or other implementations. In some instances, a wireless token device can be included in a wireless headset device also capable of being used in telephone calls, in some cases consistent with the principles described in U.S. patent application Ser. No. 13/340,631, filed Dec. 29, 2011, entitled "Simplified Mobile Communication Device", and hereby incorporated by reference in its entirety, as if completely and fully set forth herein. Further, as discussed above, for example, in connection with FIGS. 6A-6C, a wireless token device can be embodied in a feature rich device, such as a smartphone or other mobile computing device. In any instance, where a user trusts the security of a wireless token device, for instance, because the user wears, carries, or is otherwise in nearly constant possession of the wireless token device (e.g., given its size and ease of carrying), the user can elect to have the wireless token device serve as a wireless and convenient mechanism for authenticating the user to the user's devices. This can also simplify a user's use of multiple cooperating devices, allowing a user to, in some cases, to move from one device to another and automatically authenticate to the devices as the user (i.e., the carrying the wireless token device) comes within range of the cooperating device (e.g., defined by a range of a short range wireless network or other radio-frequency-based technique).

In some instances, one or more cooperating computing devices can be locked and rendered inoperable pending authentication by a particular wireless token device. While in some instances, authentication data exchanged with a cooperating computing device by wireless token device unlocks certain user profile data (i.e., data authorized for access by a particular user), in other instances, a particular cooperating computing device itself can be unlocked through a successful authentication of the wireless token device to the particular cooperating computing device. In such instances, a cooperating computing device's 310 operation can be dependent on a particular wireless token device being collocated with the cooperating computing device, the wireless token device serving as a wireless key to secure one or more of a user's computing devices (e.g., tablets, laptops, gaming systems, hard drives, etc.) from unauthorized access.

FIGS. 7A-7E are simplified flowcharts 700*a-e* illustrating example techniques for utilizing a wireless token device. For instance, in the example of FIG. 7A, a cooperating computing device can be detected 702 over a short-range wireless network by a wireless token device. A communication session can be established 704 between the cooperating computing device and the wireless token device over the short-range wireless network. The wireless token device can function as a wireless storage device, such as a wireless "thumbdrive," a send 705 data stored on the wireless token device over the short-range wireless connection to the cooperating computing device for presentation on the cooperating computing device. Further, in some instances, the stored data can be modified and updated on the wireless token device based on user interactions with the data using the cooperating computing device. In some instances, the wireless token device may lack user interfaces allowing for presentation of the stored data to a user or interaction with the data by a user. Additionally, in some implementations, before sending 705 the data to the cooperating computing device, the wireless token device may authenticate the cooperating computing device based on authentication data received from the cooperating computing device verifying the identity of the cooperating computing device. Further, the wireless token device can be used across multiple devices, allowing the data stored on the wireless token device to be accessed and presented on various devices of a user (i.e., when substantially collocated and communicating with the wireless token device over a short-range wireless network).

Turning to FIG. 7B, in another example, a cooperating computing device can be detected 706 over a short-range wireless network by a wireless token device. A communication session can be established 708 between the cooperating computing device and the wireless token device over the short-range wireless network. The wireless token device can serve as an authentication device for authenticating a user to various cooperating computing devices, allowing the user to use the cooperating computing device to access other data and services, including data and services hosted by servers remote from the wireless token device and respective cooperating computing device. For instance, the wireless token device can send 705 authentication data stored on the wireless token device over the short-range wireless connection to the cooperating computing device. The cooperating computing device can use the authentication data to authenticate the wireless token device (and its user) to access of the device and/or particular data, programs, and services accessible through the wireless token device, including data the wireless token device is unable to present using its own interfaces. In some instances, the authentication data can be used by the cooperating computing device to authenticate access (using the cooperating computing device) to data, services, and other resources hosted by a server system (such as a cloud server) remote from the wireless token device and cooperating computing device. In some instances, the cooperating computing device can forward all or a portion of the received authentication data from the wireless token device to the server system for consideration by the server system in authenticating the cooperating computing device's access and use of resources hosted by the remote server system.

Turning to FIG. 7C, in some examples, a potential cooperating computing device can detect 712 a wireless token device as substantially collocated with a wireless token device on a short-range wireless network. A communication session can be established 714 between the computing device and the wireless token device over the short-range wireless network and authentication data can be received 716 from the wireless token device over the short-range wireless network. The computing device can authenticate 718 access to particular data based on the received authentication data. This can include authenticating a holder of the wireless token device to data stored locally on the computing device, authorizing the data's presentation on the computing device based on the authentication. In other instances, additional authentication data stored on the computing device can be unlocked and authorized, based on the authentication 718, for use by the computing device to authenticate to other data and services, including data and service hosted by remote systems, such as cloud computing systems. Whether used to authenticate to locally- or remotely-served data, the computing device can retrieve 720 the data and present 722 the data using interfaces of the cooperating computing device.

In instances where data or services are hosted by a remote server device, a wireless token device can be used to authenticate a user's access to the data or services and can be re-used across multiple cooperating computing devices to authenticate access to the data or services using the multiple cooperating computing devices. In one example, shown in FIG. 7D, authentication data can be received 724 from a computing device communicating with a wireless token device. The authentication data can be received by a server device remote from the computing device and wireless token device, the server device serving computing resources in a computing session, such as in a persistent computing session. Such a session can include such computing sessions as streaming digital media presentations, sessions with web applications or other remotely-hosted applications, sessions providing access to remotely-hosted data, and so on. The authentication data can be sent by the computing device is response to receiving data from the wireless token device. The data from the wireless token device can include the received (at 724) authentication data or other data used, for example, by the computing device to authorize the sending or release of the authentication data received 724 by the computing device hosting the computing session. The server device can authenticate 726 the computing device and allow the computing device access to resources hosted by the server device. The server device can serve resources of the session to the authenticated computing device (and its user), for instance, for presentation on the computing device. In some instance, the server device can identify a user profile associated with the authentication data (and wireless token device), and the server device can customize or apply particular user data to the session served 728 to the computing device. Further, the same wireless token device can provide authentication data to other computing devices, thereby allowing the other computing devices to be authenticated to, join or consume, the same or other computing sessions hosted by the server device or another remote server device, among other examples.

Figure 7E:
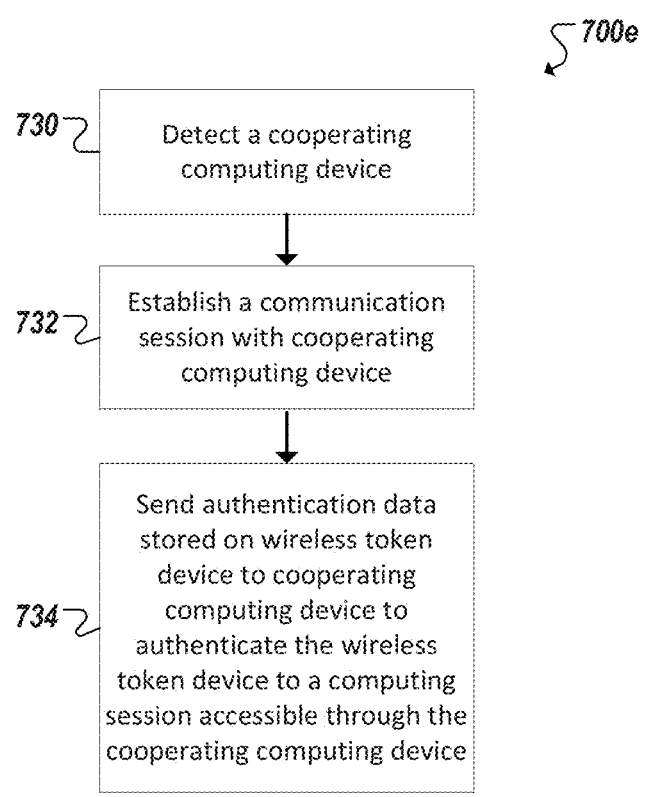

Turning to FIG. 7E, a wireless token device can detect 730 a cooperating computing device using a short-range wireless network. A communication session can be established 732 between the cooperating computing device and the wireless token device over the short-range wireless network. The wireless token device can serve as an authentication device for authenticating a user to various computing sessions served by computing devices remote from the cooperating computing device and wireless token device. For instance, the wireless token device can send 734 authentication data stored on the wireless token device over the short-range wireless connection to the cooperating computing device for use by the cooperating computing device in authenticating to a particular computing session hosted by a remote server, such as a cloud server. The cooperating computing device can then be used by the user of the wireless token device to consume resources and services of the computing session (e.g., because the wireless token device lacks user interfaces for presenting or interacting with the computing session directly). Further, in some implementations, the wireless token device can be configured to send a series of authentication data to the cooperating computing device, allowing the cooperating computing device to periodically or substantially continuously reauthenticate to the particular computing session. If the cooperating computing device loses its connection to the wireless token device for a period exceeding a particular time-out or after a particular number of attempts to reconnect to the cooperating computing device (thereby allowing for some network faults typical in short-range and other wireless network communications), the cooperating computing device will not receive the next authentication data from the wireless token device and will not be able to reauthenticate to the particular computing session. Such an instance can serve as an indication that the wireless token device is no longer collocated with the cooperating computing device and the authorized user (i.e., the holder of the wireless token device). Further, in some examples, a user can use the wireless token device to participate in computing sessions using a multiple different devices, either serially or concurrently. Indeed, in some examples, such as in a persistent computing session, a user can migrate from one cooperating computing device to another allowing the user to continue participating in the computing session and remain authenticated to the session by virtue of the wireless token device.

As noted in some of the examples above, a variety of authentication types and authentication data can be used in connection with a simplified communication device authenticating its user to a cooperating computing device. In one illustrative example, a wireless token device can authenticate to a cooperating computing device using a certificate exchange between the devices. For instance, the wireless token device, upon identifying a potential cooperating computing device, can request access to the cooperating computing device. The wireless token device can pass a certificate to the cooperating computing device. In some instances, the passing of the certificate can be in connection with an initial pairing of the wireless token device and cooperating computing device. The cooperating computing device can verify the received certificate and generate a key, for instance, for use in subsequent communications between the cooperating computing device and wireless token device. The wireless token device can similarly utilize a certificate received from the cooperating computing device and generate its own key for use in communications with the cooperating computing device. Generation of such keys by either device can be based on and generated from both an internal key, device ID, GUUID, or other data internal to the device, through a hardware-assisted trusted computing environment, data (e.g., a certificate) received from the other device in the pairing, or other techniques for use in securing integrity of the operations and data shared between devices. Further, the communication channels used by a wireless token device and cooperating computing device in a communication session can themselves be secured, for instance, utilizing authenticated network access protocols such as EAP, EAP-TLS, EAP-MSCHAP v2, and PEAP or other standard. Additionally, wireless protection protocols such as WEP, WPA, WPA2, etc. can also be used, among other techniques to secure communications between a wireless token device and cooperating computing devices.

In some instances, two-factor security or authentication measures can be applied in connection with a wireless token device authenticating to a cooperating computing device. In some instances, prior to using a particular wireless token device to authenticate a user to a cooperating computing device, the particular wireless token device and particular cooperating device can negotiate a relationship governing their cooperative functioning and communications. For instance, an encryption scheme can be pre-negotiated between a wireless token device and cooperating device to ensure that data communicated between the devices over a short-range wireless network are secure. In such instances, the authentication data sent from the wireless token device can itself be encrypted as it is communicated from the wireless token device to the cooperating device. The cooperating device can utilize the authentication data to authenticate the user of the wireless token device to the cooperating device.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. Systems and tools illustrated can similarly adopt alternate architectures, components, and modules to achieve similar results and functionality. For instance, in certain implementations, multitasking, parallel processing, and cloud-based solutions may be advantageous. In one alternative system or tool, the wireless authentication functionality of a simplified mobile communication device can be employed on a removable storage device, such as a portable hard drive, thumb drive, or the like. In such instances, the removable storage device can lack a user interface but possess wireless access functionality for connecting to cooperating computing devices over a short-range network, such as Bluetooth, and sharing authentication data with the cooperating computing devices over the short-range network to authenticate the holder of the wireless, portable storage device to one or more cooperating computing devices, allowing the user to both gain access to (and secure) the cooperating computing device through the wireless storage device as well as access, consume, and modify data stored on the hard drive using the authenticated-to cooperating computing device. Other systems and tools can also make use of principles of this disclosure. Additionally, diverse user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. Network elements can encompass various types of routers, switches, gateways, bridges, loadbalancers, firewalls, servers, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one machine accessible storage medium having instructions stored thereon, the instructions when executed on a machine, cause the machine to:
receive, from a first computing device, first authentication data based on data received by the first computing device from a wireless token device over a wireless connection between the first computing device and the wireless token device and based at least in part on the wireless token device being in proximity to the first computing device, wherein the first authentication data is associated with a first user and is to be used to authenticate the first user to a particular computing session hosted remote from the first computing device;
authenticate the first computing device for use by the first user in the particular computing session based on the received first authentication data;
permit the first computing device to consume resources of the particular computing session based on the first authentication data;
receive, from a second computing device, second authentication data based on data received by the second computing device from the wireless token device over a wireless connection between the second computing device and the wireless token device and based at least in part on the wireless token device being in proximity to the second computing device, wherein the second authentication data is associated with the first user;

authenticate the second computing device for use by the particular user in the particular computing session based on the received second authentication data; and permit the second computing device to consume resources of the particular computing session based on the second authentication data, wherein the particular computing session is associated with the first user and is to persist during a transition from use of the first computing device to use of the second computing device by the first user.

2. The storage medium of claim 1, wherein the instructions when executed on a machine, further cause the machine to terminate participation of the first computing device in the particular computing session.

3. The storage medium of claim 2, wherein the participation of the first computing device is to be terminated based on a removal of the wireless token device from the first computing device.

4. The storage medium of claim 3, wherein the instructions when executed on a machine, further cause the machine to attempt to re-authenticate the first computing device based on forwarding of additional authentication data received by the first computing device from the wireless token device.

5. The storage medium of claim 3, wherein the termination of the participation of the first computing device is to be based on termination data received from the first computing device identifying that the first computing device is no longer in communication with the wireless token device.

6. The storage medium of claim 1, wherein both the first and second computing devices are to be authenticated to the particular computing session at a first instance.

7. The storage medium of claim 1, wherein the first computing device is of a first type and the second computing device is of a second type different from the first type.

8. The storage medium of claim 7, wherein at least some of the resources of the particular computing session are to be consumed by both the first and second computing devices.

9. The storage medium of claim 8, wherein the first and second computing devices are to each present the at least some of the resources to be consumed by both the first and second computing devices.

10. The storage medium of claim 9, wherein the at least some of the resources to be consumed by both the first and second computing devices are to be rendered on the first computing device differently than on the second computing device.

11. The storage medium of claim 7, wherein the instructions when executed on a machine, further cause the machine to identify a type of each device based on authentication data received from the respective device.

12. The storage medium of claim 1, wherein the authentication data originates from the wireless token device and is to be forwarded by the first computing device to a server device hosting the particular computing session.

13. The storage medium of claim 12, wherein the authentication data is to be encrypted using a public key paired to a private key of the server device.

14. The storage medium of claim 1, wherein the authentication data is hosted on the first computing device and receipt of data from the wireless token authorizes forwarding of the authentication data to a server device hosting the particular computing session.

15. The storage medium of claim 1, wherein the wireless token device is paired to a server device hosting the particular computing session.

16. The storage medium of claim 1, wherein the particular computing session is a digital streaming media presentation.

17. The storage medium of claim 1, wherein the particular computing session is a session with a software application hosted by the server device.

18. The storage medium of claim 1, wherein the particular computing session is hosted by a cloud computing system.

19. The storage medium of claim 1,
wherein the instructions when executed on a machine, further cause the machine to identify user profile data associated with the first user; and applying the user profile data within the particular computing session.

20. The storage medium of claim 1, wherein at least one other device associated with a second user other than the first user also consumes resources within the particular computing session.

21. A method comprising:
receiving, from a first computing device, first authentication data forwarded by the first computing device from a wireless token device to a server device hosting a particular computing session, the first authentication data associated with a first user and used to authenticate the first user to the particular computing session, wherein the first authentication data was received by the first computing device from the wireless token device over a wireless communication channel and based at least in part on the wireless token device being in proximity to the first computing device;

authenticating the first computing device for use by the first user in the particular computing session based on the received first authentication data;

permitting the first computing device to consume resources of the particular computing session based on the first authentication data;

receiving, from a second computing device, second authentication data based on data received by the second computing device from the wireless token device over a wireless connection between the second computing device and the wireless token device and based at least in part on the wireless token device being in proximity to the second computing device, wherein the second authentication data is associated with the first user;

authenticating the second computing device for use by the particular user in the particular computing session based on the received second authentication data; and permitting the second computing device to consume resources of the particular computing session based on the second authentication data, wherein the particular computing session is associated with the first user and persists during a transition from use of the first computing device to use of the second computing device by the first user.

22. A system comprising:
at least one processor device;
at least one memory element; and
a session manager, adapted when executed by the at least one processor device to:
manage hosting of a particular computing session;
receive, from a first computing device, first authentication data forwarded by the first computing device from a wireless token device, the first authentication data to be used to authenticate a first user to the particular computing session, wherein the first authentication data is associated with a first user and was received by the first computing device from the wireless token device over a wireless communication channel and based at least in part on the wireless token device being in proximity to the first computing device;

authenticate the first computing device for use by the first user in the particular computing session based on the received first authentication data;

permit the first computing device to consume resources of the particular computing session based on the first authentication data;

receive, from a second computing device, second authentication data based on data received by the second computing device from the wireless token device over a wireless connection between the second computing device and the wireless token device and based at least in part on the wireless token device being in proximity to the second computing device, wherein the second authentication data is associated with the first user;

authenticate the second computing device for use by the particular user in the particular computing session based on the received second authentication data; and permit the second computing device to consume resources of the particular computing session based on the second authentication data, wherein the particular computing session is associated with the first user and is to persist during a transition from use of the first computing device to use of the second computing device by the first user.

* * * * *